(12) United States Patent
Kosaka

(10) Patent No.: US 12,276,334 B2
(45) Date of Patent: Apr. 15, 2025

(54) UNIT

(71) Applicant: JATCO Ltd, Fuji (JP)

(72) Inventor: Masahiro Kosaka, Ebina (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 18/566,344

(22) PCT Filed: Mar. 18, 2022

(86) PCT No.: PCT/JP2022/012846
§ 371 (c)(1),
(2) Date: Dec. 1, 2023

(87) PCT Pub. No.: WO2022/270059
PCT Pub. Date: Dec. 29, 2022

(65) Prior Publication Data
US 2024/0247713 A1    Jul. 25, 2024

(30) Foreign Application Priority Data

Jun. 26, 2021    (JP) .................................. 2021-106196

(51) Int. Cl.
*F16H 57/04*    (2010.01)
*F16H 57/037*    (2012.01)
*F16H 57/02*    (2012.01)

(52) U.S. Cl.
CPC ......... *F16H 57/045* (2013.01); *F16H 57/037* (2013.01); *F16H 2057/02034* (2013.01); *F16H 2057/02052* (2013.01)

(58) Field of Classification Search
CPC .............. F16H 57/045; F16H 57/037; F16H 2057/02034; F16H 2057/02052; B60K 2001/001
See application file for complete search history.

(56) References Cited

U.S. PATENT DOCUMENTS

| | | | |
|---|---|---|---|
| 10,760,676 B2* | 9/2020 | Kawaguchi | ......... F16H 57/0457 |
| 11,413,946 B2* | 8/2022 | Absenger | .............. F16H 57/045 |
| 11,578,798 B2* | 2/2023 | Nakata | ................ F16H 57/0483 |
| 2013/0145879 A1* | 6/2013 | Nakamura | .......... F16H 57/0441 |
| | | | 74/467 |
| 2016/0153546 A1 | 6/2016 | Ogawa et al. | |
| 2020/0309245 A1* | 10/2020 | Kuramoto | .............. B60K 17/12 |
| 2022/0216771 A1* | 7/2022 | Kawashima | ........ F16H 57/0441 |

FOREIGN PATENT DOCUMENTS

| | | | | |
|---|---|---|---|---|
| DE | 10 2018 203 696 A1 | 9/2019 | | |
| JP | 2009-127772 A | 6/2009 | | |
| JP | 2016-102502 A | 6/2016 | | |
| JP | 2018100717 A | * 6/2018 | ............... B60K 1/00 |

* cited by examiner

*Primary Examiner* — Sherry L Estremsky
(74) *Attorney, Agent, or Firm* — Foley & Lardner LLP

(57) ABSTRACT

Provided is a unit including: a housing configured to accommodate a gear connected to a motor, and a catch tank provided in the housing, in which the gear rotates integrally with a differential case, the catch tank has a portion that overlaps the gear when viewed in an axial direction, and the catch tank has a portion that overlaps the motor when viewed in the axial direction.

6 Claims, 16 Drawing Sheets

UNIT

TECHNICAL FIELD

The present invention relates to a unit.

BACKGROUND ART

Patent Document 1 discloses a reduction gear (unit) capable of cooling a heat-generating portion of an electric motor.

PRIOR ART DOCUMENT

Patent Document

Patent Document 1: JP 2016-102502 A

SUMMARY OF INVENTION

It is required to prevent an increase in dimension of this type of unit.

A unit according to an aspect of the present invention is a unit including:
a housing configured to accommodate a gear connected to a motor; and a catch tank provided in the housing, in which
the gear rotates integrally with a differential case,
the catch tank has a portion that overlaps the gear when viewed in an axial direction, and
the catch tank has a portion that overlaps the motor when viewed in the axial direction.

According to an aspect of the present invention, an increase in dimension of the unit in a radial direction is prevented.

DESCRIPTION OF EMBODIMENTS

Figure 1:
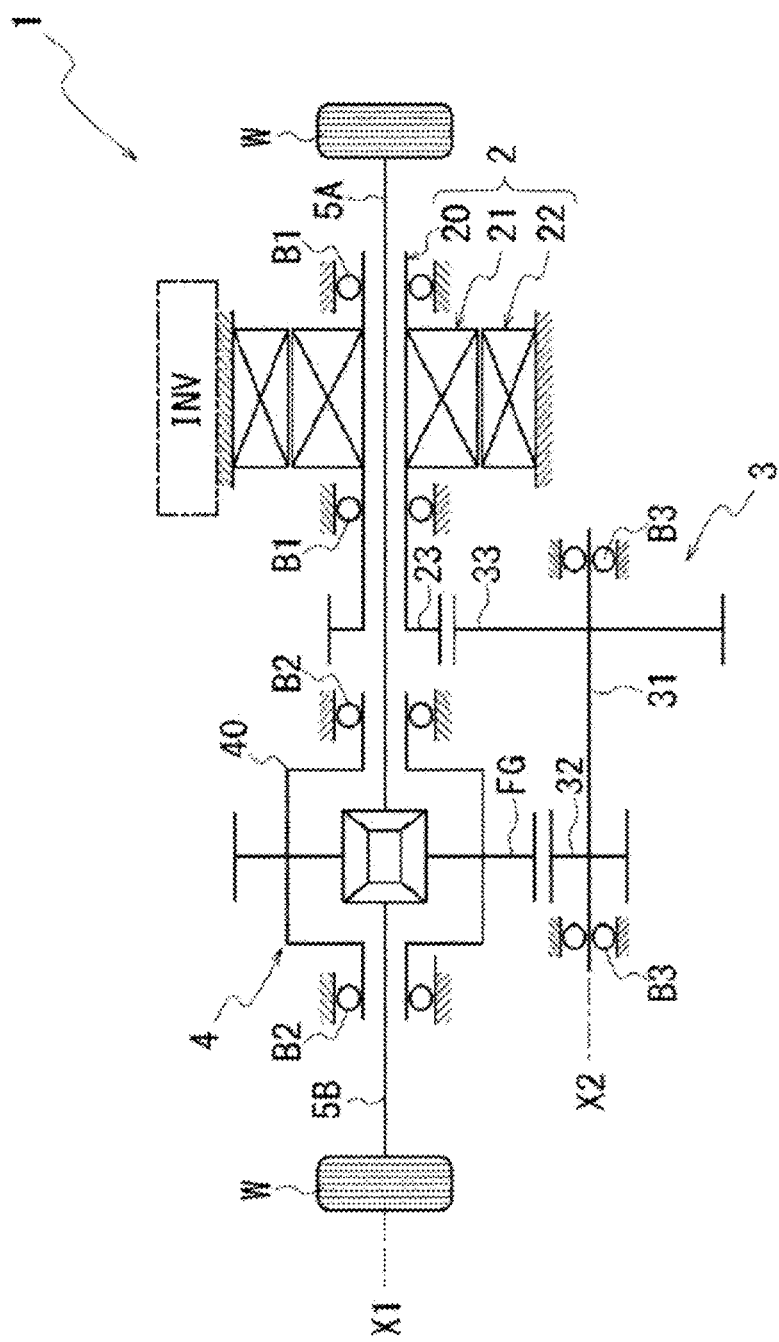
FIG. 1 is a skeleton diagram showing a state in which a unit is mounted on a vehicle.

First, definitions of terms in the present specification will be described.

A "unit" is also referred to as a "motor unit", a "power transmission device", or the like. The motor unit is a unit that includes at least a motor. The power transmission device is a device that includes at least a power transmission mechanism and is, for example, a gear mechanism and/or a differential gear mechanism. A unit that is a device including a motor and a power transmission mechanism belongs to the concept of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are disposed in a predetermined direction, in the description of the specification, it may be considered that there is a sentence explaining that the plurality of elements overlap when viewed in the predetermined direction.

The descriptions "do not overlap when viewed in a predetermined direction" and "are offset when viewed in a predetermined direction" mean that a plurality of elements are not disposed in a predetermined direction, and have the same meaning as the descriptions "do not overlap in a predetermined direction" and "are offset in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are not disposed in a predetermined direction, in the description of the specification, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing shows that the first element is positioned between the second element and the third element when viewed in a predetermined direction, in the description of the specification, it may be considered that there is a sentence explaining that the first element is between the second element and the third element when viewed in the predetermined direction.

In a case where two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. Examples of components include a motor, a gear mechanism, and a differential gear mechanism.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. The integrated formation of the catch tank and the housing contributes to a reduction in the number of components.

A "coolant" is a refrigerant, such as a liquid (cooling water or the like) or a gas (air or the like). The coolant is a concept that includes oil, but when both oil and coolant are described in the present specification, it means that the coolant is made of a material different from that of the oil.

Hereinafter, an embodiment of the present invention will be described.

FIG. 1 is a skeleton diagram showing a state in which a unit 1 is mounted on a vehicle.

Figure 2:
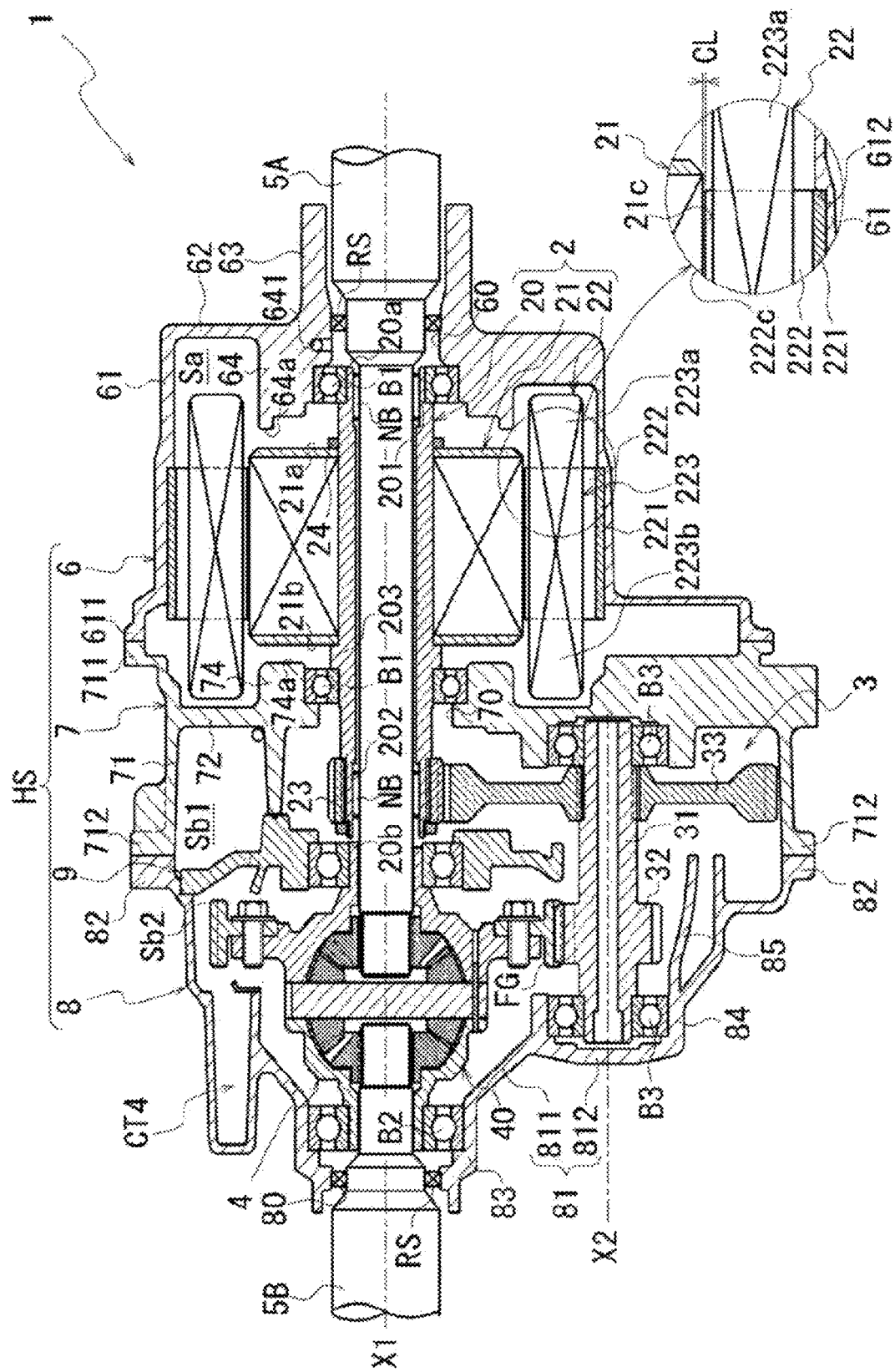
FIG. 2 is a schematic cross-sectional view of the unit.

FIG. 2 is a schematic cross-sectional view of the unit 1. FIG. 2 shows a cross section of the unit 1, in which an idler gear 3 and a differential device 4 are shown in cross section.

Figure 3:
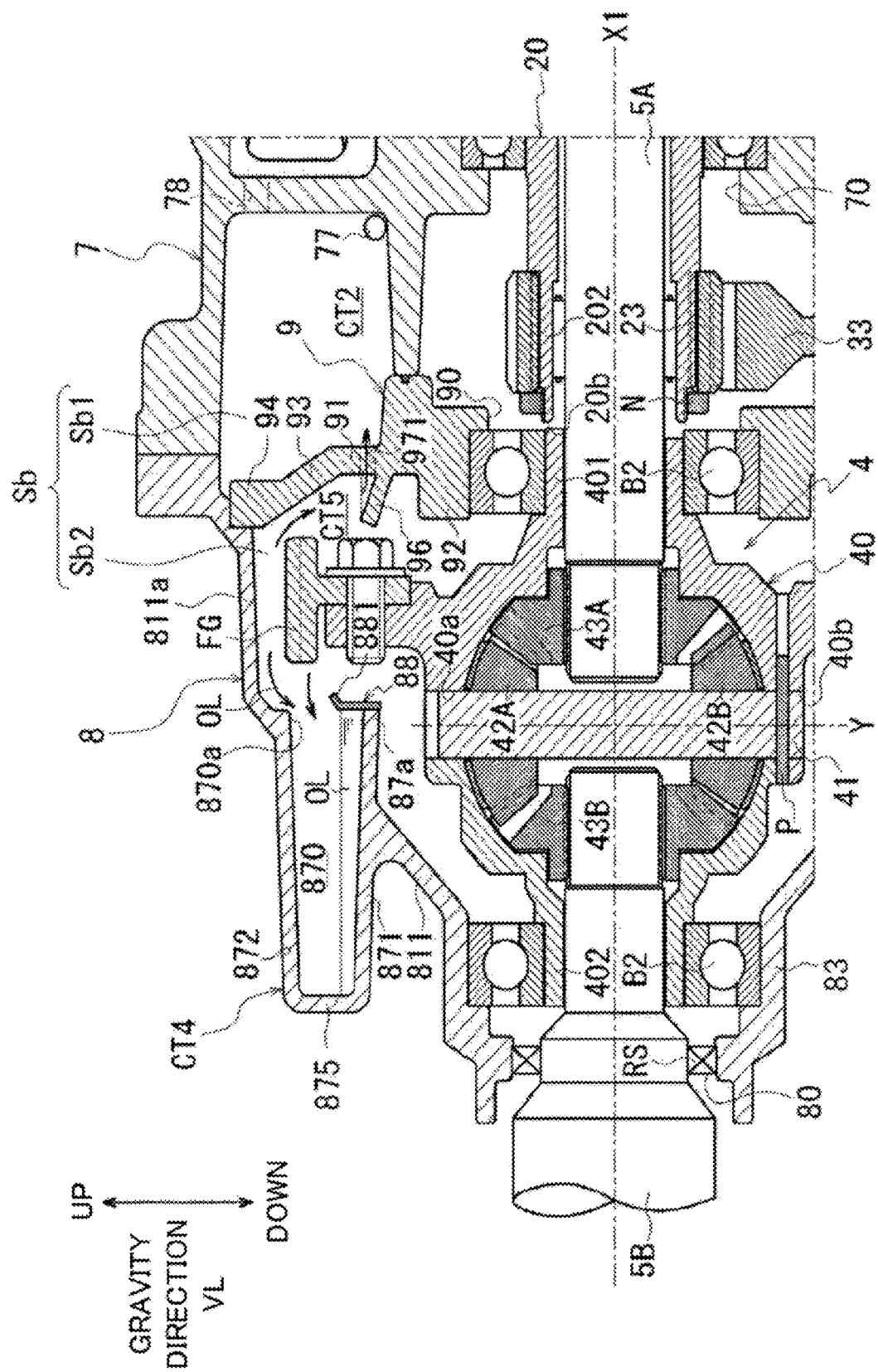
FIG. 3 is an enlarged cross-sectional view showing the vicinity of a catch tank of the unit.

FIG. 3 is an enlarged cross-sectional view showing the vicinity of a catch tank CT4 of the unit 1.

Figure 4:
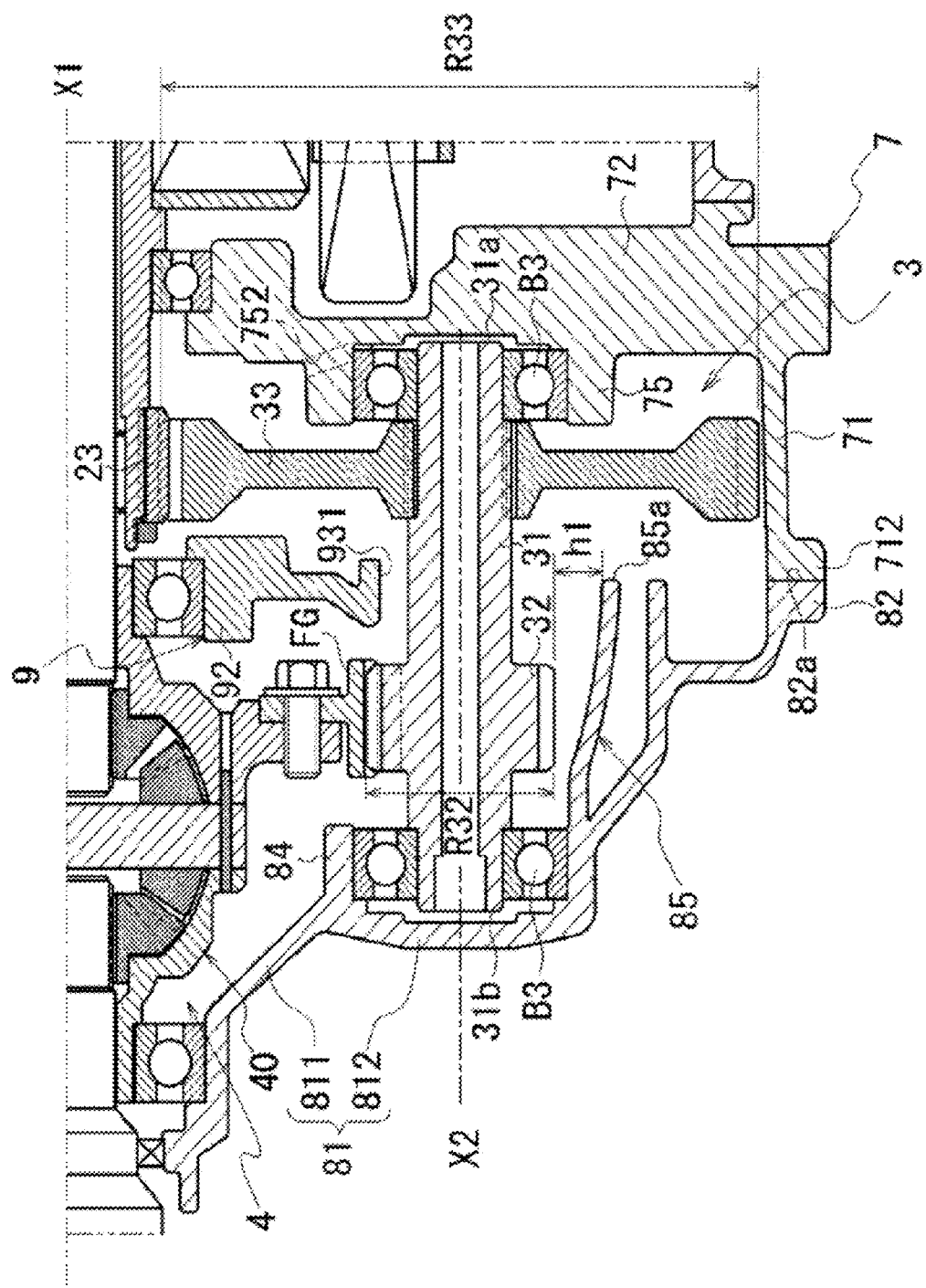
FIG. 4 is an enlarged cross-sectional view showing the vicinity of an idler gear of the unit.

FIG. 4 is an enlarged cross-sectional view showing the vicinity of the idler gear 3 of the unit 1.

Figure 5:
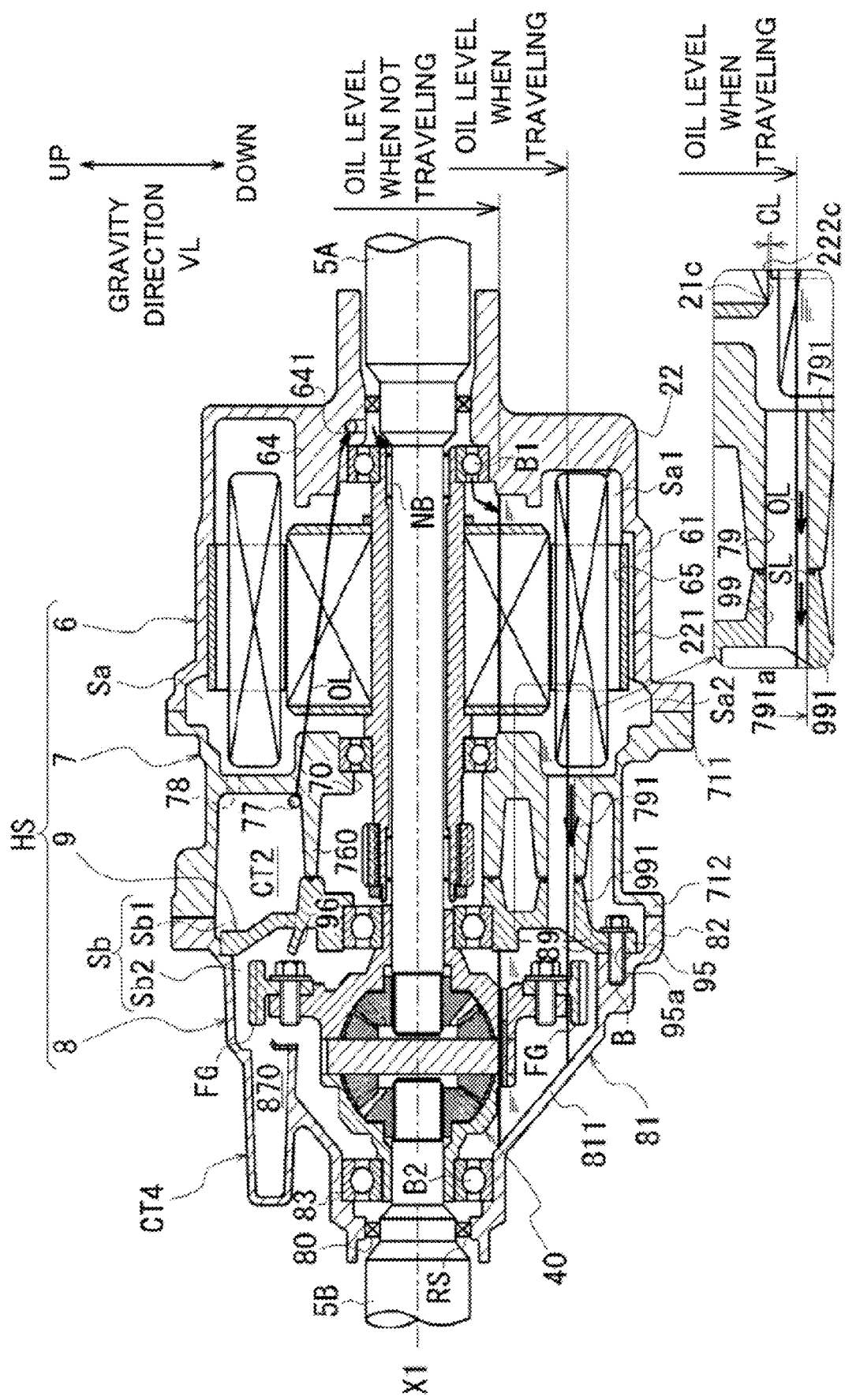
FIG. 5 is a schematic cross-sectional view of the unit.

FIG. 5 is a cross-sectional view of the unit 1 in a gravity direction VL when the unit 1 is mounted on the vehicle.

As shown in FIG. 1, the unit 1 includes a motor 2, the idler gear 3 (reduction gear) that decelerates output rotation of the motor 2 and inputs the output rotation to the differential device 4, a drive shaft 5 (5A and 5B), and an inverter INV that is a power conversion device of the motor 2.

In the unit 1, the idler gear 3, the differential device 4, and the drive shaft 5 (5A and 5B) are provided along a transmission path of the output rotation of the motor 2.

The output rotation of the motor 2 is decelerated by the idler gear 3 and input to the differential device 4, and then transmitted to left and right drive wheels W and W of the vehicle on which the unit 1 is mounted via the drive shaft 5 (5A and 5B).

Here, the idler gear 3 is connected downstream of the motor 2. The differential device 4 is connected downstream of the idler gear 3. The drive shaft 5 (5A and 5B) is connected downstream of the differential device 4.

As shown in FIG. 2, a housing HS of the unit 1 includes a motor case 6, an intermediate case 7, a gear case 8, and a cover 9.

The housing HS accommodates oil OL used for cooling and lubrication, and a gear train (idler gear 3 and differential device 4) as a power transmission mechanism. The motor 2 is accommodated in the motor case 6 of the housing HS. The gear train (idler gear 3 and differential device 4) as a power transmission mechanism is accommodated in the gear case 8.

The oil OL used for cooling and lubrication is accommodated in at least one of the motor case 6 or the gear case 8.

The intermediate case 7 includes a tubular peripheral wall portion 71 and a wall portion 72.

The intermediate case 7 is disposed such that the peripheral wall portion 71 is oriented along a rotation axis X1 of the drive shaft 5 (5A and 5B). The peripheral wall portion 71 surrounds the rotation axis X1 with a gap therebetween.

In the peripheral wall portion 71, a joint portion 711 with the motor case 6 is provided at one end portion in a rotation axis X1 direction. In the peripheral wall portion 71, a joint portion 712 with the gear case 8 is provided at the other end portion in the rotation axis X1 direction.

In the peripheral wall portion 71, the wall portion 72 is provided in a region between the joint portion 711 and the joint portion 712. The wall portion 72 extends inward from an inner periphery of the peripheral wall portion 71. The wall portion 72 is provided in a direction orthogonal to the rotation axis X1. The wall portion 72 is provided in a range that crosses the rotation axis X1 of the drive shaft 5 (5A and 5B) and a rotation axis X2 of the idler gear 3.

The wall portion 72 corresponds to a wall which is a portion sandwiched between a final gear FG (gear) in the housing HS and the motor 2.

A through hole 70 is provided in a region of the wall portion 72 that intersects with the rotation axis X1. The through hole 70 penetrates the wall portion 72 in a thickness direction (rotation axis X1 direction: left-right direction in the drawing).

A tubular motor support portion 74 surrounding the through hole 70 is provided on a surface of the wall portion 72 closer to the motor case 6 (right side in the drawing). The motor support portion 74 is formed with an inner diameter larger than that of the through hole 70, and a bearing B1 is supported on an inner periphery of the motor support portion 74.

The motor case 6 includes a tubular peripheral wall portion 61 and a wall portion 62.

The motor case 6 is provided such that the peripheral wall portion 61 is oriented along the rotation axis X1. The peripheral wall portion 61 surrounds the rotation axis X1 with a gap therebetween.

In the peripheral wall portion 61, the wall portion 62 is provided at one end portion in the rotation axis X1 direction, and a joint portion 611 with the intermediate case 7 is provided at the other end portion in the rotation axis X1 direction.

The wall portion 62 extends radially inward from the one end portion of the peripheral wall portion 61 in the rotation axis X1 direction. The wall portion 62 is provided in a direction orthogonal to the rotation axis X1. A through hole 60 is provided in a region of the wall portion 62 that intersects with the rotation axis X1. The through hole 60 penetrates the wall portion 62 in a thickness direction (left-right direction in the drawing).

A tubular wall portion 63 surrounding the through hole 60 is provided on an outer surface (right-side surface in the drawing) of the wall portion 62. The tubular wall portion 63 extends outward (rightward in the drawing) of the housing HS along the rotation axis X.

A lip seal RS is provided on an inner periphery of the tubular wall portion 63. The lip seal RS seals a gap between the inner periphery of the tubular wall portion 63 and an outer periphery of the drive shaft 5A.

A tubular motor support portion 64 surrounding the through hole 60 is provided on an inner surface (left-side surface in the drawing) of the wall portion 62. The motor support portion 64 extends to the inside of the housing HS (leftward in the drawing) along the rotation axis X1.

The motor support portion 64 is formed with an inner diameter larger than that of the through hole 60, and a bearing B1 is supported on an inner periphery of the motor support portion 64.

In the motor support portion 64, an oil hole 641 is opened in a region between the bearing B1 and the lip seal RS. The oil OL collected in a catch tank CT2 to be described later is supplied to the oil hole 641 via a pipe (not shown) attached to the housing HS.

In the housing HS, the motor case 6 and the intermediate case 7 are assembled with the joint portions 611 and 711 joined in the rotation axis X1 direction. In this state, a space between the wall portions 62 and 72 inside the peripheral wall portion 61 and the peripheral wall portion 71 serves as a motor chamber Sa that accommodates the motor 2.

The motor 2 includes a cylindrical motor shaft 20, a cylindrical rotor core 21 fitted onto the motor shaft 20, and a stator core 22 surrounding an outer periphery of the rotor core 21 with a gap therebetween.

The motor shaft 20 is a cylindrical member fitted onto the drive shaft 5A.

One end portion 20a of the motor shaft 20 in a longitudinal direction serves as a supported portion 201 supported by the bearing B1, and the other end portion 20b serves as a coupling portion 202 with an input gear 23.

Inner peripheries of the supported portion 201 and the coupling portion 202 are supported by needle bearings NB and NB that are fitted onto the drive shaft 5A. In this state, the motor shaft 20 is rotatable relative to the drive shaft 5A.

In the motor shaft 20, the bearing B1 is fitted and positioned on an outer periphery of the supported portion 201 at the end portion 20a.

Further, the bearing B1 is fitted and positioned on an outer periphery of the motor shaft 20 at a position away from the end portion 20b toward the end portion 20a (right side in the drawing).

The motor shaft 20 is rotatably supported at the one end portion 20a and the other end portion 20b in the longitudinal direction by the motor support portions 64 and 74 via the bearings B1 and B1, respectively.

In the motor shaft 20, the rotor core 21 is fixed in a region between the bearings B1 and B1 in the rotation axis X1 direction. The rotor core 21 is formed by laminating a plurality of silicon steel plates. Each of the silicon steel plates is fitted onto the motor shaft 20 in a state in which relative rotation with respect to the motor shaft 20 is restricted.

The silicon steel plate has a ring shape when viewed from the rotation axis X1 direction. On an outer peripheral side of the silicon steel plate, N-pole and S-pole magnets (not shown) are alternately provided in a circumferential direction around the rotation axis X.

The end portion 21b of the rotor core 21 in the rotation axis X1 direction is positioned by a large-diameter portion 203 of the motor shaft 20. The end portion 21a of the rotor core 21 is positioned by a stopper 24 press-fitted onto the motor shaft 20.

The stator core 22 is positioned outside the rotor core 21 in a radial direction. The stator core 22 is formed by laminating a plurality of electromagnetic steel plates. Each of the electromagnetic steel plates includes a ring-shaped yoke portion 221 and a teeth portion 222 protruding from an inner periphery of the yoke portion 221 toward the rotor core 21.

In the present embodiment, the stator core 22 in which a winding 223 is wound around the plurality of teeth portions 222 in a distributed manner is adopted. The stator core 22 is longer than the rotor core 21 in the rotation axis X1 direction by lengths of coil ends 223a and 223b protruding in the rotation axis X1 direction.

A stator core in which windings are concentratedly wound around each of the plurality of teeth portions 222 protruding toward the rotor core 21 may be adopted.

The yoke portion 221 of the stator core 22 is inserted into an inner periphery of the peripheral wall portion 61 of the motor case 6 from the intermediate case 7. A stepped portion 612 is provided on the inner periphery of the peripheral wall portion 61. The stator core 22 is positioned at a position where the yoke portion 221 is in contact with the stepped portion 612 in the peripheral wall portion 61.

In this state, an inner periphery 222c of the teeth portion 222 of the stator core 22 faces the outer periphery of the rotor core 21 with a slight air gap CL (gap) from an outer periphery 21c of the rotor core 21.

As shown in FIG. 5, in the peripheral wall portion 61 of the motor case 6, a communication groove 65 is formed in the inner periphery of a lower region in a gravity direction VL. In the peripheral wall portion 61, the communication groove 65 is provided at one location in a circumferential direction around the rotation axis X1.

The communication groove 65 extends along the rotation axis X direction on an outer diameter side of the yoke portion 221 of the stator core 22. A plurality of communication grooves 65 may be provided. For example, a plurality of communication grooves 65 may be provided at intervals in the circumferential direction around the rotation axis X1 in the lower region of the peripheral wall portion 61.

A lower space of the motor chamber Sa is divided into a space on one side (first space Sa1) and a space on the other side (second space Sa2) with the yoke portion 221 interposed therebetween. Since the stator core 22 is positioned between the first space Sa1 and the second space Sa2, it is difficult for the oil OL to move between the first space Sa1 and the second space Sa2.

In the present embodiment, the communication groove 65 is provided in the lower region of the peripheral wall portion 61 in the gravity direction VL, more preferably, in a lowermost region. As a result, the oil OL can move between the first space Sa1 and the second space Sa2 through the communication groove 65. Therefore, the oil OL can easily move between the first space Sa1 and the second space Sa2.

As shown in FIG. 2, the motor support portions 64 and 74 are inserted from the rotation axis X1 direction on inner diameter sides (rotation axis X1 side) of the coil ends 223a and 223b of the stator core 22. The motor support portions 64 and 74 are formed with an outer diameter smaller than inner diameters of the coil ends 223a and 223b. A distal end 64a of the motor support portion 64 faces the end portion 21a of the rotor core 21 with a gap therebetween in the rotation axis X1 direction, and a distal end 74a of the motor support portion 74 faces the end portion 21b of the rotor core 21 with a gap therebetween in the rotation axis X1 direction.

In the motor shaft 20 onto which the rotor core 21 is fitted, the other end portion 20b passes through the through hole 70 of the intermediate case 7 from the motor case 6 side to the gear case 8 side (left side in the drawing).

As shown in FIG. 3, the end portion 20b of the motor shaft 20 faces a cylindrical support portion 401 of the differential device 4 with a gap therebetween in the rotation axis X1 direction. In the motor shaft 20, the input gear 23 is spline-fitted to an outer periphery of the coupling portion 202 closer to the end portion 20b. The input gear 23 is positioned in the rotation axis X1 direction by a nut N screwed onto the outer periphery of the coupling portion 202.

As shown in FIG. 4, a large gear 33 of the idler gear 3 meshes with an outer periphery of the input gear 23 so as to be capable of transmitting rotation. In the idler gear 3, the large gear 33 is spline-fitted to an outer periphery of a cylindrical shaft portion 31.

Bearings B3 and B3 are fitted onto one end portion 31a and the other end portion 31b in a longitudinal direction of the shaft portion 31. The bearing B3 fitted onto the end portion 31a of the shaft portion 31 is inserted into a cylindrical support portion 75 of the intermediate case 7. The end portion 31a of the shaft portion 31 is rotatably supported by the support portion 75 of the intermediate case 7 via the bearing B3.

The bearing B3 fitted onto the end portion 31b of the shaft portion 31 is inserted into a cylindrical support portion 84 of the gear case 8. The end portion 31b of the shaft portion 31 is rotatably supported by the support portion 84 of the gear case 8 via the bearing B3.

In this state, the shaft portion 31 of the idler gear 3 is provided along a rotation axis X2 parallel to the rotation axis X1. When the output rotation of the motor 2 is input via the large gear 33, the shaft portion 31 of the idler gear 3 rotates about the rotation axis X2.

In the shaft portion 31, a small gear 32 is provided at a position away to the end portion 31b (left side in the drawing) when viewed from the large gear 33. The small gear 32 is formed integrally with the shaft portion 31 and has an outer diameter R32 smaller than an outer diameter R33 of the large gear 33.

The small gear 32 meshes with the final gear FG fixed to a differential case 40 of the differential device 4 so as to be capable of transmitting rotation.

As shown in FIG. 3, the differential case 40 is formed in a hollow shape in which a shaft 41, bevel gears 42A and 42B, and side gears 43A and 43B are accommodated.

In the differential case 40, tubular support portions 401 and 402 are provided on both sides in the rotation axis X1 direction (left-right direction in the drawing). The support portions 401 and 402 extend along the rotation axis X1 in a direction away from the shaft 41.

A bearing B2 is fitted onto the support portion 402 of the differential case 40. The bearing B2 is supported on an inner periphery of a cylindrical support portion 83 of the gear case 8. The support portion 402 of the differential case 40 is rotatably supported by the gear case 8 via the bearing B2.

The drive shaft 5B passing through an opening 80 of the gear case 8 is inserted into the support portion 402 from the rotation axis X1 direction, and the drive shaft 5B is rotatably supported by the support portion 402.

A lip seal RS is fixed to an inner periphery of the opening 80, and a gap between the outer periphery of the drive shaft 5B and the inner periphery of the opening 80 is sealed by the lip seal RS.

The bearing B2 is fitted onto the support portion 401 of the differential case 40. The bearing B2 fitted onto the support portion 401 is supported on an inner periphery of a ring-shaped support portion 92 of the cover 9. The support portion 401 of the differential case 40 is rotatably supported by the cover 9 via the bearing B2.

The drive shaft 5A passing through the through hole 60 (see FIG. 2) of the motor case 6 is inserted into the support portion 401 of the differential case 40 from the rotation axis X1 direction.

The drive shaft 5A is provided across the motor shaft 20 of the motor 2, an inner diameter side of the input gear 23, and the cover 9 in the rotation axis X1 direction, and a distal end of the drive shaft 5A is rotatably supported by the support portion 401.

As shown in FIG. 3, inside the differential case 40, the side gears 43A and 43B are spline-fitted to outer peripheries of distal end portions of the drive shafts 5A and 5B. Two side gears 43A and 43B are provided with a gap therebetween in an axial direction of the rotation axis X with teeth portions thereof facing each other, and the shaft 41 is positioned between the side gears 43A and 43B.

One end and the other end of the shaft 41 are inserted into shaft holes 40a and 40b of the differential case 40. In the differential case 40, the shaft 41 is fixed by a pin P.

The bevel gears 42A and 42B are fitted onto the shaft 41 and rotatably supported. Two bevel gears 42A and 42B are provided with a gap therebetween in a longitudinal direction (axial direction of axis Y) of the shaft 41. The bevel gears 42A and 42B are disposed with teeth portions thereof facing each other.

In the differential case 40, the bevel gears 42A and 42B and the side gears 43A and 43B are assembled with teeth portions thereof meshing with one another.

As shown in FIG. 2, the differential case 40 and the idler gear 3 are accommodated in a gear chamber Sb (Sb2 and Sb1) between the gear case 8 and the intermediate case 7.

In the housing HS, the gear chamber Sb (see FIG. 5) is provided between the gear case 8 and the intermediate case 7. A gear train for transmitting the output rotation of the motor 2 is accommodated in the gear chamber Sb.

As shown in FIG. 5, the gear chamber Sb is divided into a first gear chamber Sb1 closer to the motor 2 and a second gear chamber Sb2 closer to the differential device 4 by the cover 9 fixed to the gear case 8.

Figure 6:
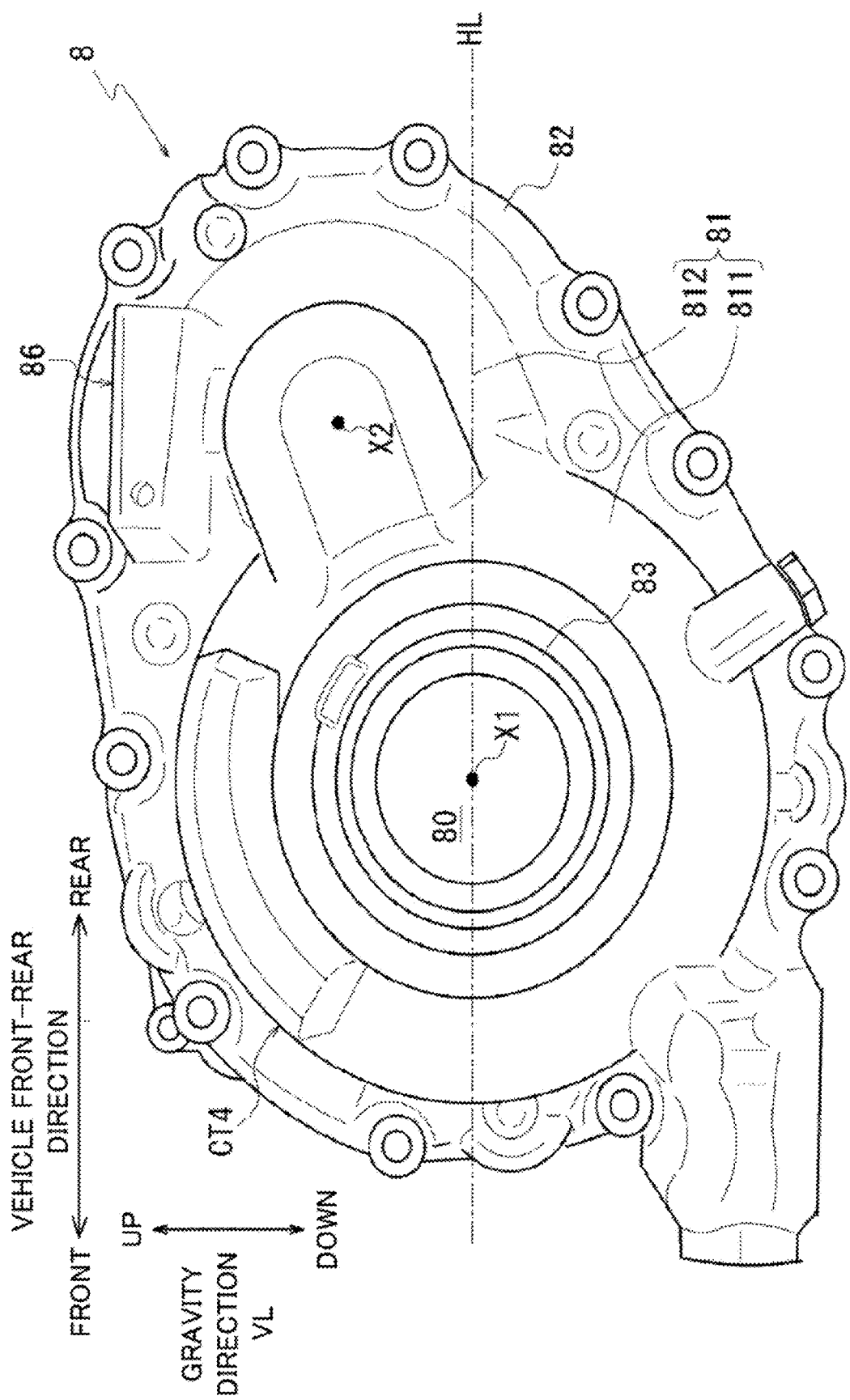
FIG. 6 is a plan view of a gear case.

FIG. 6 is a plan view of the gear case 8 viewed from the outside in the rotation axis X1 direction.

Figure 7:
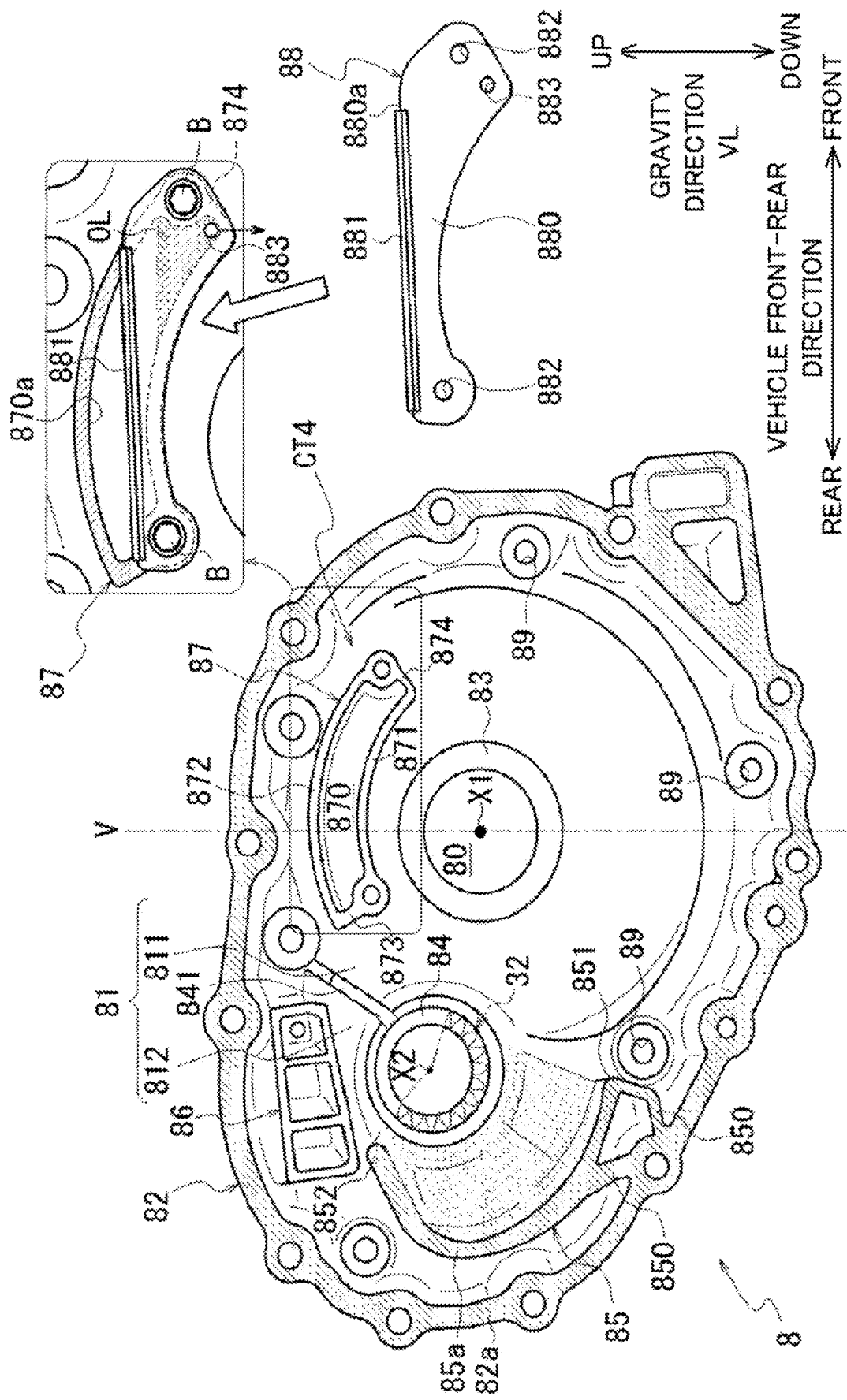
FIG. 7 is a plan view of the gear case.

FIG. 7 is a plan view of the gear case 8 viewed from the intermediate case 7 in the rotation axis X1 direction.

FIG. 7 shows an enlarged view of a region of a catch tank CT4 and a plate 88 attached to the catch tank CT4. Further, in FIG. 7, for convenience of description, a region of a joint portion 82 and a region of a catch guide 85 are indicated by hatching.

As shown in FIG. 2, the gear case 8 includes a tubular peripheral wall portion 81. The peripheral wall portion 81 has a first region 811 surrounding an outer periphery of the differential device 4, and a second region 812 surrounding an outer periphery of the small gear 32 of the idler gear 3.

The peripheral wall portion 81 is formed in a shape capable of accommodating the differential device 4 and the small gear 32 of the idler gear 3.

In the peripheral wall portion 81, the support portion 83 for the bearing B2 is provided at one end portion in the rotation axis X1 direction. The support portion 83 has a cylindrical shape that surrounds the rotation axis X1 with a gap therebetween, and the bearing B2 is fixed to the inner periphery of the support portion 83.

In the peripheral wall portion 81, the joint portion 82 with the intermediate case 7 is provided at the other end portion in the rotation axis X1 direction. The joint portion 82 extends radially outward in a flange shape from an end portion of the gear case 8 closer to the intermediate case 7.

As shown in FIG. 7, when viewed in the rotation axis X1 direction, the joint portion 82 surrounds the entire periphery of an opening of the gear case 8 closer to the intermediate case 7, and the first region 811 and the second region 812 are positioned inside the joint portion 82.

The opening 80 is provided in a substantially central portion of the first region 811. As shown in FIG. 5, the opening 80 allows the inside and the outside of the gear case 8 to communicate with each other, and is formed with an inner diameter through which the drive shaft 5B can be inserted. The first region 811 is inclined with respect to the rotation axis X1 in a direction in which an inner diameter increases from the support portion 83 toward the joint portion 82.

As shown in FIG. 6, when viewed from the rotation axis X1 direction, the rotation axis X2 of the idler gear 3 is positioned on an upper side in the gravity direction VL and at the rear in a vehicle front-rear direction, when the unit 1 is installed in the vehicle.

When viewed in the rotation axis X1 direction, the second region 812 of the peripheral wall portion 81 is positioned on a rear side of the first region 811 and above a horizontal line HL passing through the rotation axis X1.

As shown in FIG. 4, the support portion 84 for the bearing B3 is provided in the second region 812. The support portion 84 has a tubular shape surrounding the rotation axis X2 with a gap therebetween. The support portion 84 extends from an inner surface of the second region 812 to the intermediate case 7 (right side in the drawing) along the rotation axis X2.

In the second region 812, the catch guide 85 is provided at a position extending from the support portion 84. The catch guide 85 is formed integrally with the gear case 8 and is provided in a direction along the rotation axis X2. The catch guide 85 extends outside of the small gear 32 of the idler gear 3 in radial direction toward the large gear 33 (right side in the drawing).

In a cross-sectional view along the rotation axis X2, the catch guide 85 is curved such that a separation distance h1 from the outer periphery of the small gear 32 increases toward an end portion 85a closer to the large gear 33.

The end portion 85a of the catch guide 85 reaches an outer diameter side of the cover 9 to be described later, and when viewed in a radial direction of the rotation axis X1, the end portion 85a of the catch guide 85 and the cover 9 are positioned to overlap each other. That is, when viewed in the radial direction of the rotation axis X1, the end portion 85a of the catch guide 85 and the cover 9 overlap each other.

As shown in FIG. 7, the end portion 85a of the catch guide 85 is positioned on the same plane as an end surface 82a of the joint portion 82 of the gear case 8.

When viewed in a rotation axis X2 direction, the catch guide 85 is formed in an arc shape inside the joint portion 82 (closer to rotation axis X2) so as to surround the rotation axis X2 with a gap therebetween. One end portion 851 of the catch guide 85 in a circumferential direction around the rotation axis X2 is positioned below the rotation axis X2 in the gravity direction VL. The end portion 851 is connected to the joint portion 82 via connection walls 850 and 850.

The other end portion 852 of the catch guide 85 is positioned below an air breather 86 and extends to substantially the same height as an upper end of the support portion 84.

The catch guide 85 is formed as a wall that continues from the one end portion 851 to the other end portion 852 in the circumferential direction around the rotation axis X2. When viewed from the rotation axis X2 direction, a curvature radius of the end portion 852 of the catch guide 85 is smaller than a curvature radius of the end portion 851.

Therefore, a separation distance between the catch guide 85 and the outer periphery of the small gear 32 of the idler gear 3 supported by the support portion 84 changes not only in the rotation axis X2 direction (see FIG. 4) but also in the circumferential direction around the rotation axis X2 (see FIG. 7).

In the present embodiment, the separation distance between the catch guide 85 and the outer periphery of the small gear 32 is greatest downward in the gravity direction VL and decreases upward in the gravity direction VL.

Here, when the vehicle equipped with the unit 1 travels, the oil in the housing HS is scraped up by the small gear 32 and the final gear FG. When the vehicle travels forward, in the gear case 8, the oil OL scraped up by the final gear FG moves upward along an inner periphery of the catch guide 85 (see arrows in FIG. 16).

In the present embodiment, the curvature radius of the end portion 852 of the catch guide 85 is reduced, and the end portion 852 of the catch guide 85 is inserted below the air breather 86. As a result, of the oil OL moving upward along the inner periphery of the catch guide 85, a flow of the oil OL moving toward the air breather 86 is blocked by a region closer to the end portion 852, making it difficult for the oil OL to reach the air breather 86.

As described above, in the cross-sectional view along the rotation axis X2, the catch guide 85 is curved such that the separation distance h1 from the outer periphery of the small gear 32 increases toward the end portion 85a closer to the large gear 33.

Therefore, of the oil OL moving upward along the inner periphery of the catch guide 85, at least part of the oil OL whose movement toward the air breather 86 is blocked moves toward the large gear 33 with a moving direction thereof changed to a direction along the rotation axis X2 direction.

As shown in FIG. 7, on an upper side of the support portion 84 in the gravity direction VL, a rib 841 is provided closer to the first region 811 (right side in the drawing) so as to protrude toward a front side of the drawing when viewed from the air breather 86. The rib 841 extends upward from an outer periphery of the support portion 84 and partitions the first region 811 and the second region 812.

As shown in FIG. 7, in the first region 811, the catch tank CT4 is provided above the support portion 83 in the gravity direction VL.

In FIG. 7, the catch tank CT4 has therein a space 870 that is formed to protrude from the front side to a back side of the drawing. The catch tank CT4 has a tubular wall 87. The tubular wall 87 includes an arc-shaped inner wall portion 871 surrounding an outer periphery of the support portion 83, an arc-shaped outer wall portion 872 having an inner diameter larger than that of the inner wall portion 871, and side wall portions 873 and 874. The side wall portion 873 connects end portions in a circumferential direction of the inner wall portion 871 and the outer wall portion 872. The side wall portion 874 connects end portions in a circumferential direction of the inner wall portion 871 and the outer wall portion 872.

As shown in FIG. 3, the catch tank CT4 is provided in a direction along the rotation axis X1. The catch tank CT4 protrudes from the first region 811 of the gear case 8 to the inside and the outside of the gear case 8.

The catch tank CT4 is provided at a position overlapping the peripheral wall portion 81 (first region 811) of the gear case 8 when viewed from the radial direction of the rotation axis X1. Further, the catch tank CT4 is provided at a position overlapping the peripheral wall portion 81 (first region 811) when viewed from the rotation axis X1 direction.

As shown in FIG. 3, the first region 811 of the peripheral wall portion 81 is inclined in a direction in which an outer diameter thereof decreases in a direction (leftward in the drawing) away from the intermediate case 7.

Therefore, the first region 811 portion has a spatial margin in both the rotation axis X1 direction and the radial direction of the rotation axis X1 compared to the motor case 6. In the present embodiment, by providing the catch tank CT4 in the first region 811 portion, the catch tank CT4 is prevented from protruding greatly both in the rotation axis X1 direction and in the radial direction of the rotation axis X1.

The space 870 inside the catch tank CT4 is a bottomed tubular space whose one end in the rotation axis X1 direction is sealed by a bottom wall portion 875. The space 870 is opened to the inside (second gear chamber Sb2) of the gear case 8.

An opening 870a of the catch tank CT4 is positioned above the shaft 41 of the differential case 40. The opening 870a faces the final gear FG fixed to an outer periphery of the differential case 40 from the rotation axis X1 direction.

A part of the opening 870a of the catch tank CT4 closer to the rotation axis X1 (lower side) is closed by the plate 88.

As shown in FIG. 7, the plate 88 has a plate-shaped main body portion 880. The plate 88 is formed in a shape capable of closing a region of the opening 870a closer to the rotation axis X1 (lower side in the drawing).

An upper side 880a of the main body portion 880 is formed in a linear shape, and a guide 881 extending obliquely upward on the front side of the drawing is provided in the linear portion.

Bolt holes 882 and 882 are provided on both sides of the main body portion 880 in a width direction thereof. The main body portion 880 is attached to a distal end 87a (see FIG. 3) of the tubular wall 87 by bolts B and B passing through the bolt holes 882 and 882.

As shown in FIG. 7, the catch tank CT4 is provided above the support portion 83 in the gravity direction VL in a range circumferentially crosses a vertical line V passing through the rotation axis X1.

The side wall portion 874 of the catch tank CT4 is positioned lower than the side wall portion 873 in the gravity direction VL. Here, the inner wall portion 871, which is a bottom surface of the catch tank CT4, is inclined obliquely so as to be positioned downward in the gravity direction VL toward a vehicle front side. As described above, the opening 870a of the catch tank CT4 faces a side surface of the final gear FG in the rotation axis X1 direction (see FIG. 3).

When the vehicle equipped with the unit 1 travels, the final gear FG rotating about the rotation axis X1 scrapes up the oil in the housing HS. Thus, part of the scraped-up oil OL flows into the catch tank CT4 through the opening 870a.

As shown in FIG. 7, the catch tank CT4 has an arc shape along an outer periphery of the final gear FG. Since the side wall portion 874 of the catch tank CT4 is positioned lower than the side wall portion 873 in the gravity direction VL, the oil OL flowing into the catch tank CT4 accumulates on the side wall portion 874 side (see enlarged view of FIG. 7).

Here, the plate 88 is provided with a discharge port 883 for the oil OL. An opening diameter of the discharge port 883 is sufficiently smaller than an opening area of the opening 870a of the catch tank CT4. Therefore, the amount of the oil OL discharged from the discharge port 883 is smaller than the amount of the oil OL flowing into the catch tank CT4. Thus, the oil OL collected in the catch tank CT4 is gradually returned from the discharge port 883 into the gear case 8 (second gear chamber Sb2).

As shown in FIG. 5, in the housing HS, the cover 9 is positioned closer to the motor 2 when viewed from the final gear FG.

Figure 8:
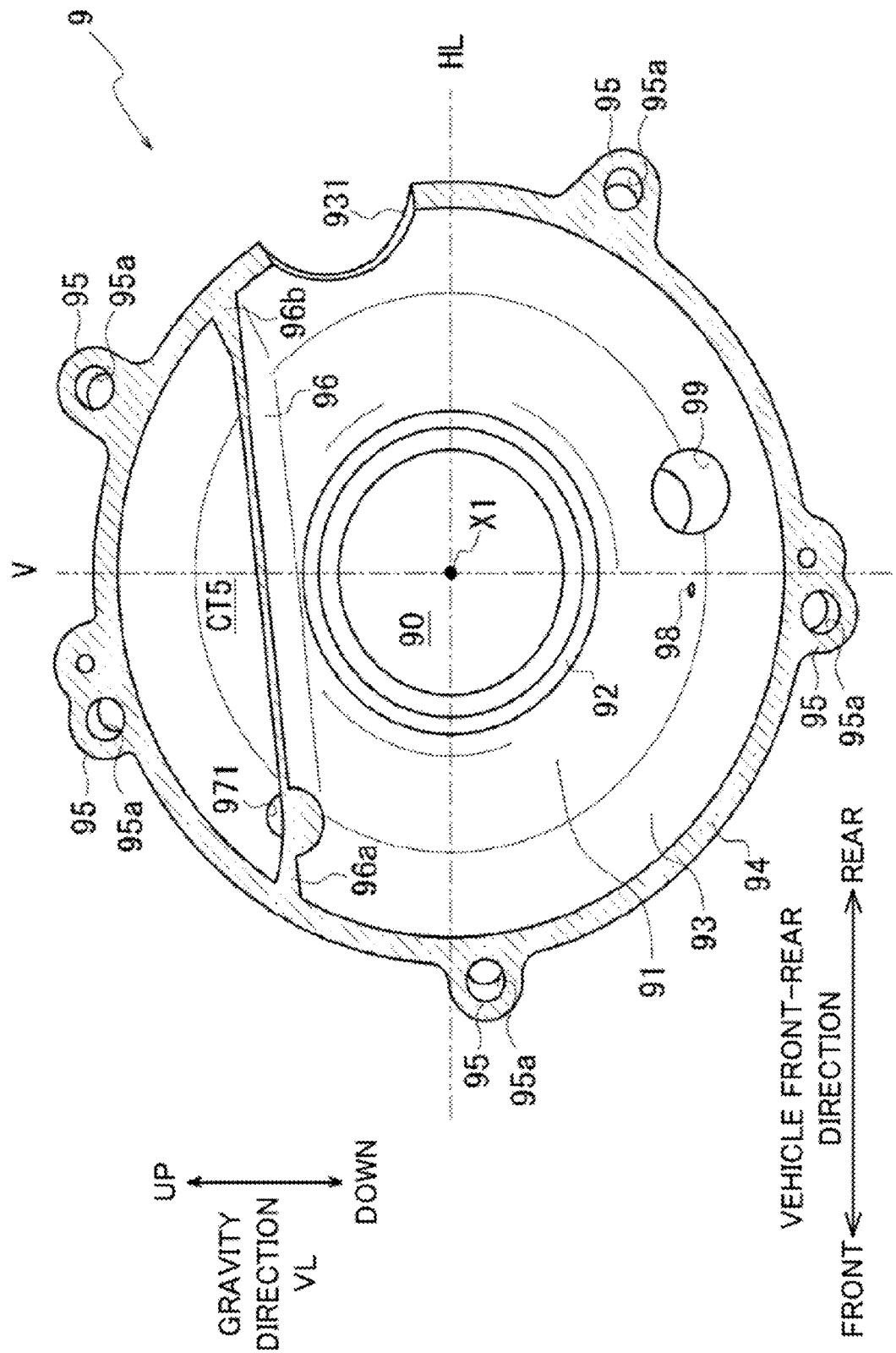
FIG. 8 is a plan view of a cover.

FIG. 8 is a plan view of the cover 9 when viewed from the gear case 8. In FIG. 8, a region of a joint portion 94, which is an attachment surface to the gear case 8, and a region of a partition wall 96 are indicated by hatching.

Figure 9:
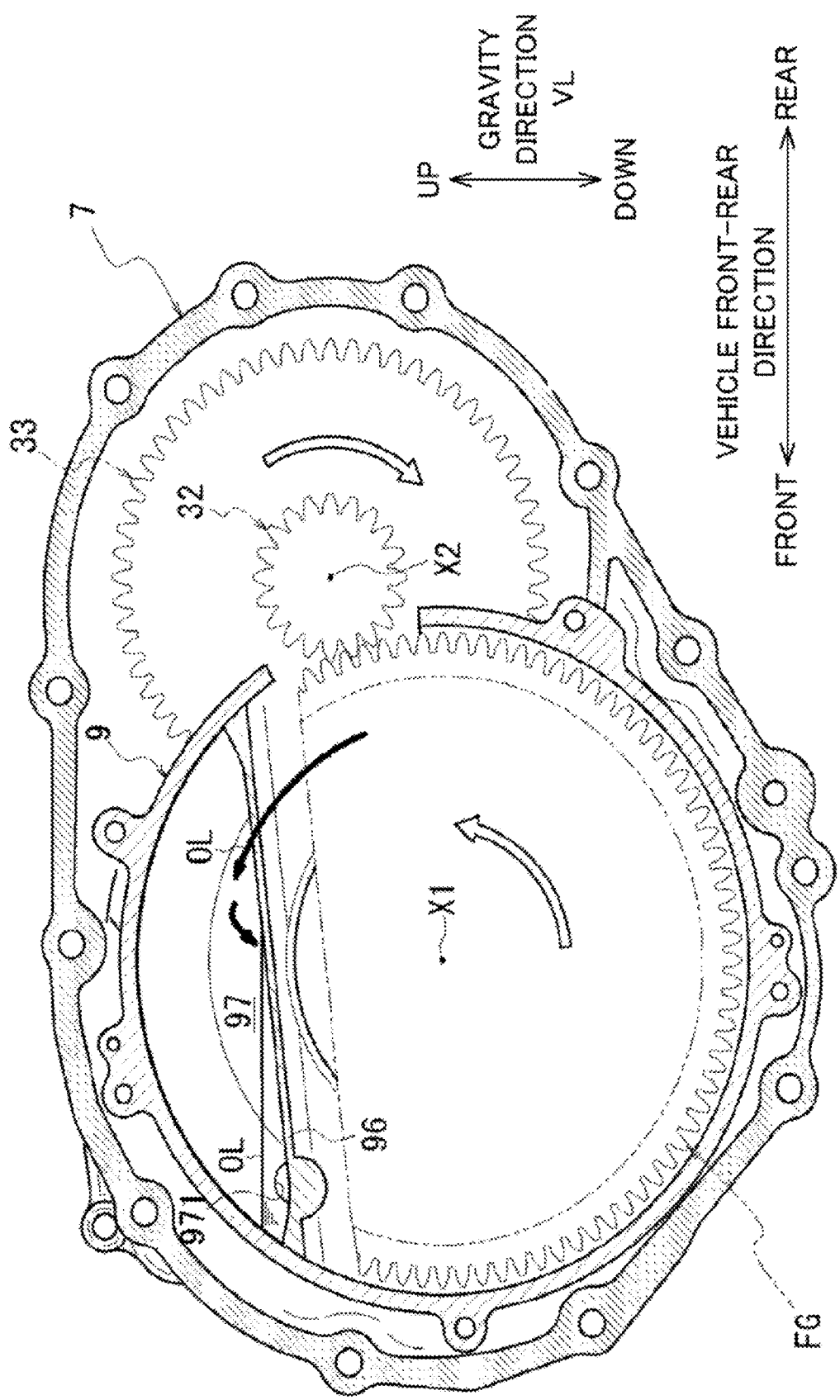
FIG. 9 is a diagram illustrating a flow of oil in an oil catch portion of the cover.

FIG. 9 is a diagram illustrating a flow of the oil OL in a catch tank CT5 of the cover 9.

As shown in FIG. 8, the cover 9 has a circular plate-shaped base portion 91. The base portion 91 is provided in a direction orthogonal to the rotation axis X1. A through hole 90 is provided in a central portion of the base portion 91. The through hole 90 penetrates the base portion 91 in a thickness direction (rotation axis X1 direction).

As shown in FIG. 3, the ring-shaped support portion 92 surrounding the through hole 90 is provided on a side (left-side surface in the drawing) of the base portion 91 closer to the gear case 8. The support portion 92 is formed with an inner diameter larger than that of the through hole 90. A bearing B2 is supported on the inner periphery of the support portion 92.

An inclined portion 93 is provided on an outer diameter side of the base portion 91. The inclined portion 93 is inclined with respect to the rotation axis X1 in a direction approaching the final gear FG toward the outer diameter side.

The final gear FG and the inclined portion 93 are provided at overlapping positions when viewed from the rotation axis X1 direction.

A flange-shaped joint portion 94 is provided on an outer periphery of the inclined portion 93. The joint portion 94 extends radially outward from the outer periphery of the inclined portion 93. The joint portion 94 is provided in a direction orthogonal to the rotation axis X1.

As shown in FIG. 8, the joint portion 94 surrounds substantially the entire outer periphery of the inclined portion 93.

The joint portion 94 is provided with a plurality of coupling pieces 95 at intervals in the circumferential direction around the rotation axis X1. The coupling piece 95 extends radially outward from an outer periphery of the joint portion 94. Each of the coupling piece 95 is provided with a bolt hole 95a. An end surface of the coupling piece 95 on the front side of the drawing and an end surface of the joint portion 94 on the front side of the drawing are positioned on the same plane.

As shown in FIG. 5, the cover 9 is fixed to the gear case 8 by bolts B passing through the bolt holes 95a of the coupling pieces 95. As shown in FIG. 7, in the first region 811 of the gear case 8, a plurality of bolt holes 89 are provided at intervals in the circumferential direction around the rotation axis X1 on an inner diameter side of the joint portion 82.

As shown in FIG. 8, in the cover 9, the partition wall 96 is provided in a region on an upper side in the gravity direction VL when the cover 9 is attached to the gear case 8.

The partition wall 96 is positioned above the support portion 92 and is provided across the vertical line V passing through the rotation axis X1 in the vehicle front-rear direction. One end portion 96a and the other end portion 96b of the partition wall 96 are connected to an inner periphery of the joint portion 94. The partition wall 96 divides the inside of the joint portion 94 into two upper and lower spaces, and forms a space functioning as the catch tank CT5 above the support portion 92.

The partition wall 96 intersects the vertical line V in a direction in which the end portion 96a is positioned lower than the end portion 96b in the gravity direction VL when the unit 1 is mounted on the vehicle.

As shown in FIG. 3, the partition wall 96 is provided in a direction inclined with respect to the rotation axis X1. The partition wall 96 is inclined upward in the gravity direction VL as approaching the final gear FG from the base portion 91. A distal end of the partition wall 96 reaches substantially the same height as the distal end 87a of the tubular wall 87 of the catch tank CT4. The catch tank CT5 is provided with an opening facing the final gear FG.

As shown in FIG. 8, inside the catch tank CT5, a discharge hole 971 is provided in a region of the inclined portion 93 in the vicinity of the end portion 96a. The discharge hole 971 penetrates the inclined portion 93 in the rotation axis X1 direction.

Here, when the vehicle equipped with the unit 1 travels, the final gear FG rotating about the rotation axis X1 scrapes up the oil in the housing HS (see FIG. 3).

In an upper portion of the gear case 8, the opening 870a of the catch tank CT4 and the opening of the catch tank CT5 are positioned on one side and the other side with the final gear FG interposed therebetween. Therefore, the opening 870a of the catch tank CT4, the catch tank CT5 closer to the cover 9, and the final gear FG are provided at overlapping positions when viewed from the rotation axis X1 direction.

Thus, when the vehicle is traveling, the oil OL scraped up by the final gear FG collides with an upper wall portion 811a of the gear case 8 (see FIG. 3). The oil OL colliding with the upper wall portion 811a moves toward the catch tank CT4 on one side and the catch tank CT5 on the other side in the rotation axis X1 direction. The oil flowing into the catch tank CT5 flows along the partition wall 96 and is discharged from the discharge hole 971 to the first gear chamber Sb1 of the gear chamber Sb (see FIGS. 9 and 5).

As shown in FIG. 8, in the cover 9, a notch 931 is provided in a region of the inclined portion 93 in the vicinity of the end portion 96b. The notch 931 is provided to avoid interference with the shaft portion 31 (see FIG. 4) of the idler gear 3.

In the inclined portion 93, the notch 931 is formed by cutting out a region below the end portion 96b of the partition wall 96 and above the horizontal line HL passing through the rotation axis X1 in an arc shape. In FIG. 8, the notch 931 is opened toward the front side of the drawing (gear case 8 side).

A discharge hole 98 and a communication hole 99 are provided below the support portion 92 in the base portion 91.

When viewed from the gear case 8, the discharge hole 98 is positioned on the vehicle front side of the vertical line V, and penetrates the base portion 91 in the thickness direction thereof. When viewed from the gear case 8, the communication hole 99 is positioned on a vehicle rear side of the vertical line V, and is provided in a range that extends over the base portion 91 and the inclined portion 93.

Figure 10:
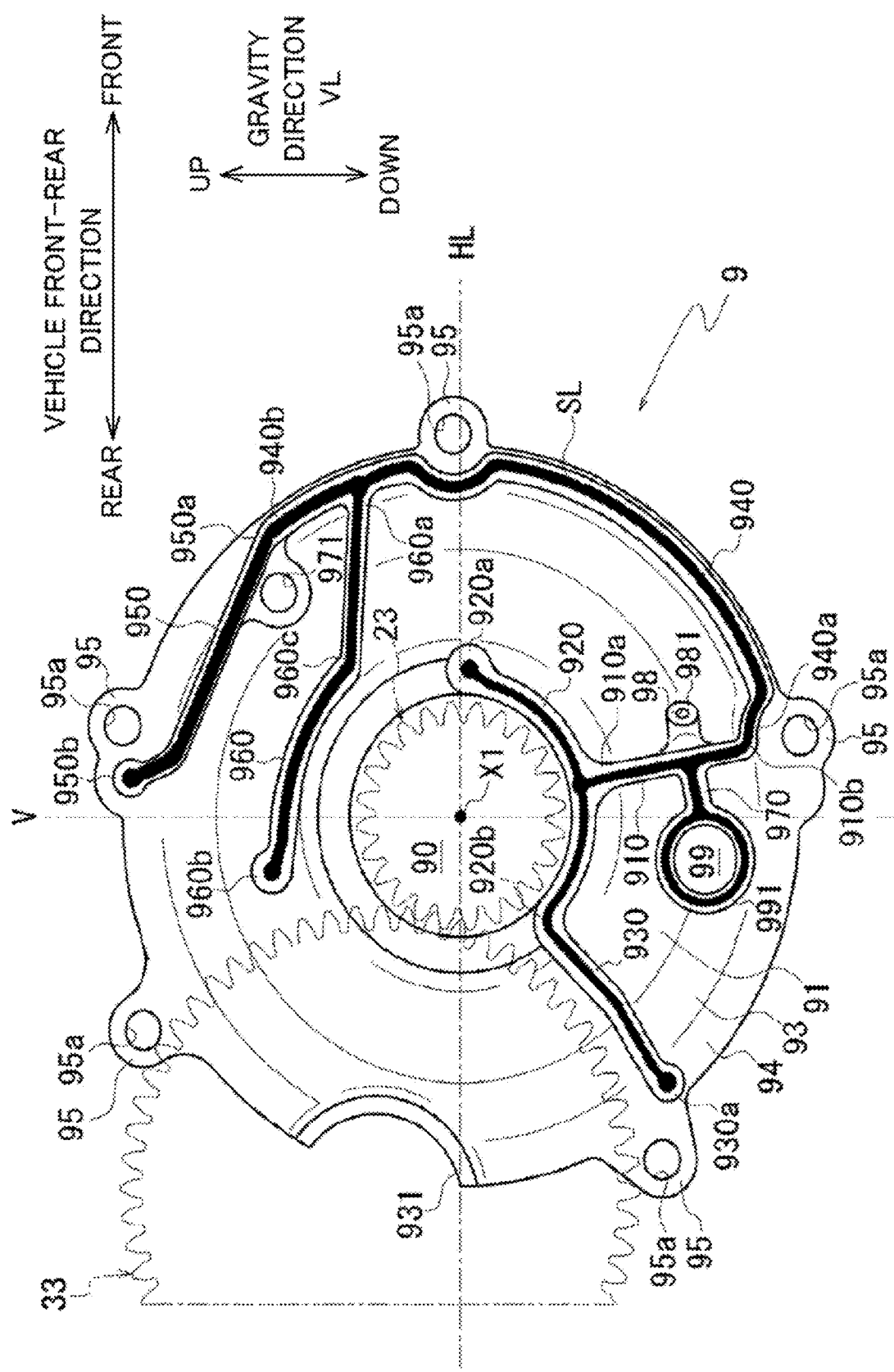
FIG. 10 is a plan view of the cover.

FIG. 10 is a plan view of the cover 9 when viewed from the intermediate case 7. In FIG. 10, positions of the input gear 23 and the large gear 33 are indicated by imaginary lines.

On a surface of the cover 9 closer to the intermediate case 7, a tubular wall portion 981 surrounding the discharge hole 98 and a tubular wall portion 991 surrounding the communication hole 99 are provided in a region below the through hole 90. The tubular wall portion 991 is formed to protrude to the front side of the drawing from the region extending over the base portion 91 and the inclined portion 93.

The tubular wall portion 981 extends in a direction away from the tubular wall portion 991. The discharge hole 98 is opened on the vehicle front side when viewed from the communication hole 99.

A first rib 910 is provided between the tubular wall portion 981 and the tubular wall portion 991. The first rib 910 is formed to protrude toward the front side of the drawing, and extends substantially linearly in the radial direction of the rotation axis X1. The end portion 910a on an inner diameter side of the first rib 910 is connected to an outer periphery of the second rib 920 surrounding the through hole 90. The first rib 910 extends from the base portion 91 to the joint portion 94 through the inclined portion 93. The end portion 910b on an outer diameter side of the first rib 910 is connected to a fourth rib 940 provided in the joint portion 94.

The second rib 920 is formed in an arc shape along an inner periphery of the through hole 90. In the unit 1, the input gear 23 is disposed on an inner diameter side of the second rib 920. Therefore, the second rib 920 is provided so as to surround the outer periphery of the input gear 23 with a gap therebetween.

An end portion 920a of the second rib 920 on the vehicle front side is positioned on the horizontal line HL.

An end portion 920b of the second rib 920 on the vehicle rear side is connected to a third rib 930 surrounding an outer periphery of the large gear 33. The end portion 920b is connected to the third rib 930 at a position substantially directly below an engagement portion between the input gear 23 and the large gear 33 in the gravity direction VL.

The end portion 920b of the second rib 920 is positioned lower than the end portion 920a in the gravity direction VL. The third rib 930 extends in the radial direction of the rotation axis X1. The third rib 930 extends from the base portion 91 to the joint portion 94 through the inclined portion 93.

When viewed from the end portion 930a, on the vehicle front side, one end portion 940a of the fourth rib 940 is connected to the end portion 910b of the first rib 910. The end portion 940a of the fourth rib 940 is curved toward the rotation axis X1 while bypassing the bolt hole 95a of the coupling piece 95. A curved end of the end portion 940a of the fourth rib 940 is connected to the end portion 910b of the first rib 910.

The fourth rib 940 is provided on the vehicle front side of the vertical line V in the joint portion 94. A region of the fourth rib 940 below the horizontal line HL is provided along the outer periphery of the joint portion 94. A region of the fourth rib 940 intersecting with the horizontal line HL is curved toward the rotation axis X1 while bypassing the bolt hole 95a of the coupling piece 95.

The other end portion 940b of the fourth rib 940 is positioned above the horizontal line HL. The other end portion 940b of the fourth rib 940 is connected to one end portion 950a of a fifth rib 950 on a lateral side of the discharge hole 971.

The other end portion 950b of the fifth rib 950 is positioned in the vicinity of the vertical line V and at a boundary portion between the coupling piece 95 and the joint portion 94.

In the fifth rib 950, a region between the end portions 950a and 950b passes through a region of the inclined portion 93 closer to the rotation axis X1 than the joint portion 94. In the inclined portion 93, the discharge hole 971 communicating with the catch tank CT5 (see FIG. 8) is opened in a region adjacent to the end portion 950a.

A sixth rib 960 is provided closer to the rotation axis X1 when viewed from the fifth rib 950. One end portion 960a of the sixth rib 960 is connected to an inner periphery of the fourth rib 940. The sixth rib 960 is connected to the fourth rib 940 below the discharge hole 971 and above the horizontal line HL.

The sixth rib 960 extends to the vicinity of the through hole 90, and has a region ahead of a bent portion 960c formed in an arc shape surrounding the through hole 90 with a gap therebetween. The other end portion 960b of the sixth rib 960 is positioned on the vehicle rear side of the vertical line V. The end portion 960b of the sixth rib 960 is slightly curved in a direction away from the through hole 90 (upward in the drawing) in a region on the vehicle rear side of the vertical line V. The end portion 960b of the sixth rib 960 is disposed at a position facing the outer periphery of the large gear 33 of the idler gear 3 with a gap therebetween.

A region from the bent portion 960c of the sixth rib 960 to the vertical line V is formed with a curvature radius larger than that of the second rib 920. Further, this region is provided along the outer periphery of the input gear 23. This region is provided such that a separation distance from the outer periphery of the input gear 23 is larger than a separation distance between the outer periphery of the input gear 23 and the second rib 920.

A seventh rib 970 extending from the tubular wall portion 991 is connected to a surface of the first rib 910 closer to the vertical line V.

In the present embodiment, end surfaces of the ribs (first rib 910 to seventh rib 970) described above and the tubular wall portion 991 on the front side of the drawing are positioned on the same plane. A groove to which a sealing member SL can be attached is formed in the end surfaces of the ribs (first rib 910 to seventh rib 970) and the tubular wall portion 991 on the front side of the drawing. FIG. 10 shows a state in which the sealing member SL is installed in the groove, and a region of the sealing member SL installed in the groove is painted.

The sealing member SL is provided to come into contact with corresponding portions (ribs and tubular wall portions) in the intermediate case 7 to seal gaps between joint surfaces when the gear case 8 to which the cover 9 is assembled and the intermediate case 7 are assembled.

The sealing member SL may be an integral component or may include a plurality of components.

Figure 11:
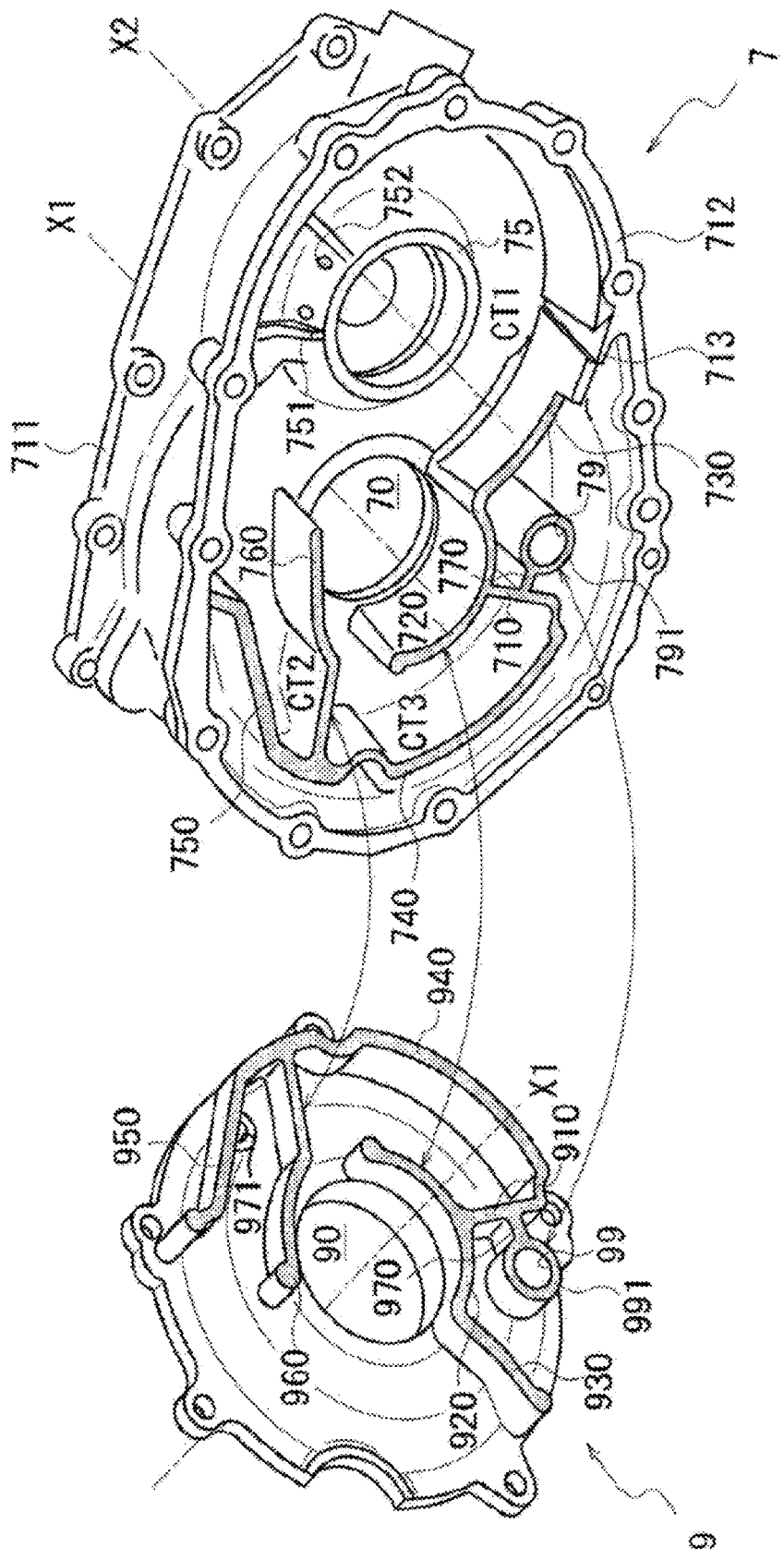
FIG. 11 is a perspective view of an intermediate case.

FIG. 11 is a perspective view of the intermediate case 7 viewed from the gear case 8 and shows the intermediate case 7 together with the cover 9. In FIG. 11, for convenience of description, portions (ribs and tubular wall portions) of the intermediate case 7 and the cover 9 that are joined together are indicated by hatching. Further, illustration of the sealing member SL is omitted.

Figure 12:
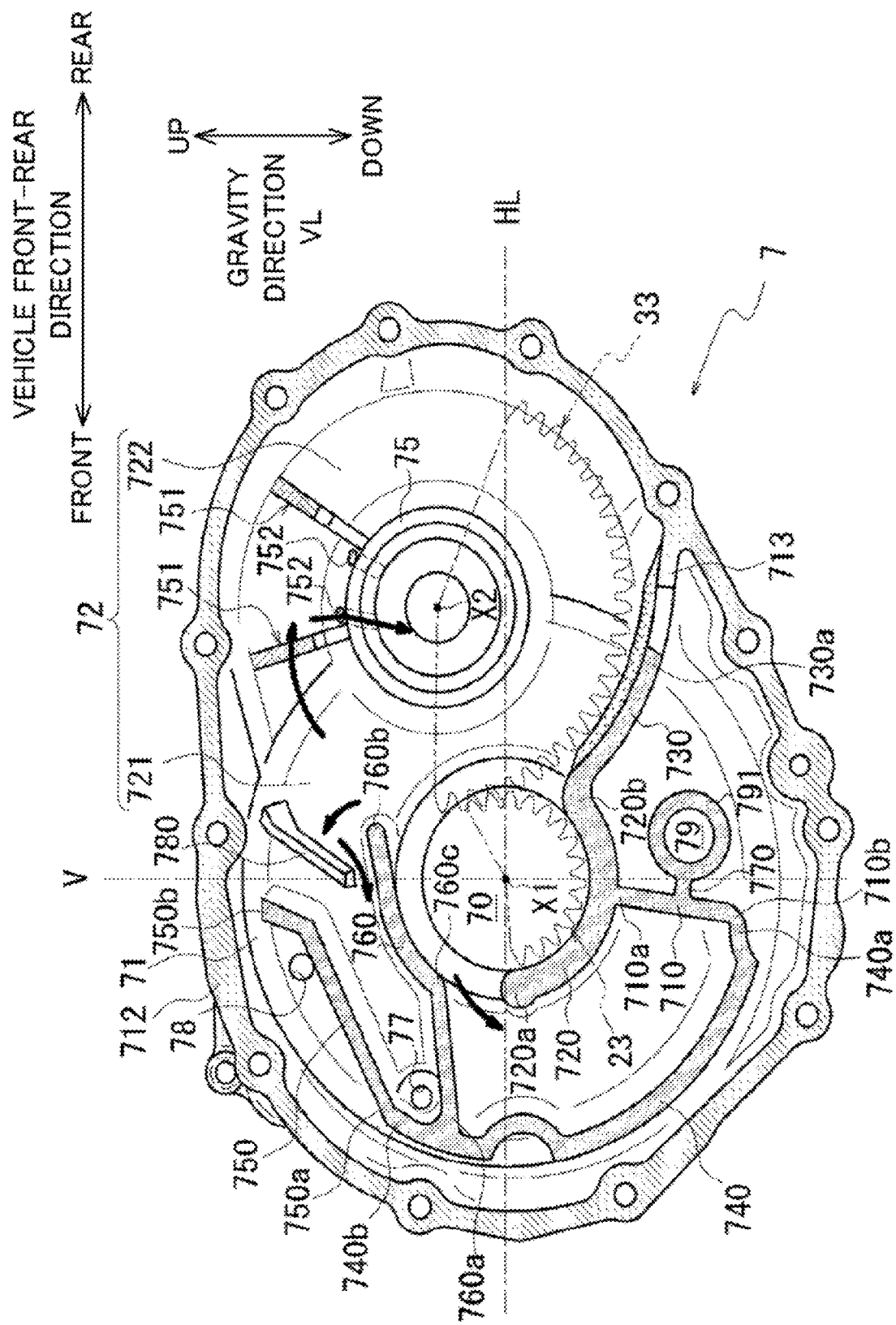
FIG. 12 is a plan view of the intermediate case.

FIG. 12 is a plan view of the intermediate case 7 when viewed from the gear case 8. In FIG. 12, for convenience of description, portions (ribs and tubular wall portions) joined to the cover 9 and a portion (joint portion 712) joined to the gear case 8 are indicated by hatching.

As shown in FIG. 2, the intermediate case 7 has the wall portion 72 inside the peripheral wall portion 71.

As shown in FIG. 12, the wall portion 72 of the intermediate case 7 has a first region 721 in which the input gear 23 is disposed, and a second region 722 in which the large gear 33 of the idler gear 3 is disposed.

The through hole 70 is opened in the first region 721. The through hole 70 is formed with an inner diameter through which the motor shaft 20 (see FIG. 2) of the motor 2 can pass. On a surface of the first region 721 closer to the gear case 8, a communication hole 79 and a tubular wall portion 791 surrounding the communication hole 79 are provided in a region below the through hole 70.

The tubular wall portion 791 is formed to protrude toward the front side of the drawing from a region adjacent to the vehicle rear side of the vertical line V in the first region 721.

The tubular wall portion 791 is provided at a position where the tubular wall portion 791 is joined to the tubular wall portion 991 of the cover 9 attached to the gear case 8 when the gear case 8 and the intermediate case 7 are assembled (see FIG. 5).

As shown in FIG. 11, in the intermediate case 7, ribs (first rib 710 to sixth rib 760) corresponding to the ribs (first rib 910 to sixth rib 960) of the cover 9 are provided to protrude toward the cover 9 on a surface facing the cover 9, respectively.

As shown in FIG. 12, the first rib 710 extends substantially linearly in the radial direction of the rotation axis X1 on a lateral side of the vehicle front side of the tubular wall portion 791. The first rib 710 is formed in a shape that matches the shape of the first rib 910 of the cover 9.

An end portion 710a of the first rib 710 closer to the rotation axis X1 is connected to an outer periphery of the second rib 720 surrounding the through hole 70. An end portion 710b on an outer diameter side of the first rib 710 is positioned on an outer diameter side of the tubular wall portion 791. The end portion 710b of the first rib 710 is connected to the fourth rib 740 provided inside the joint portion 712.

The second rib 720 is formed in an arc shape along an inner periphery of the through hole 70. The second rib 720 is formed in a shape that matches the shape of the second rib 920 of the cover 9.

In the unit 1, the input gear 23 is disposed on an inner diameter side of the second rib 720. Therefore, the second rib 720 is provided so as to surround the outer periphery of the input gear 23 with a gap therebetween. An end portion 720a of the second rib 720 on the vehicle front side is positioned on the horizontal line HL.

An end portion 720b of the second rib 720 on the vehicle rear side is connected to the third rib 730 surrounding the outer periphery of the large gear 33. The end portion 720b is connected to the third rib 730 at a position substantially directly below the engagement portion between the input gear 23 and the large gear 33 in the gravity direction VL. The end portion 720b of the second rib 720 is lower than the end portion 720a in the gravity direction VL. When viewed in the rotation axis X1 direction, the second rib 720 has a shape capable of storing the oil OL on an upper surface thereof closer to the input gear 23.

The third rib 730 extends in the radial direction of the rotation axis X1. The third rib 730 is formed in a shape that matches the shape of the third rib 930 of the cover 9.

When viewed in the rotation axis X2 direction, the third rib 730 is formed in an arc shape surrounding the outer periphery of the large gear 33. A region ahead of one end portion 730a of the third rib 730 is connected to a wall portion 713 extending from an inner periphery of the joint portion 712. The wall portion 713 is positioned on the same plane as the joint portion 712. The third rib 730 is disposed at a position closer to the motor 2 than the wall portion 713 (on the back side of the drawing in FIG. 12).

An inner periphery of the region of the wall portion 713 functions as an inflow portion into which the oil OL whose moving direction is changed to the direction along the rotation axis X2 by the catch guide 85 flows.

As shown in FIG. 12, on the vehicle front side of the tubular wall portion 791, one end portion 740a of the fourth rib 740 is connected to the end portion 710b of the first rib 710. The fourth rib 740 is provided on the vehicle front side of the vertical line V in the first region 721.

A region of the fourth rib 740 below the horizontal line HL is provided along the joint portion 712. A region of the fourth rib 740 intersecting with the horizontal line HL is curved so as to detour to the rotation axis X1 side in accordance with the shape of the fourth rib 940 of the cover 9.

The other end portion 740b of the fourth rib 740 is positioned above the horizontal line HL. The end portion 740b of the fourth rib 740 is connected to one end portion 750a of the fifth rib 750 on a lateral side of a discharge hole 77. The fourth rib 740 is formed in a shape that matches the shape of the fourth rib 940 of the cover 9.

The other end portion 750b of the fifth rib 750 is connected to the inner periphery of the peripheral wall portion 71 in the vicinity of the vertical line V. The fifth rib 750 is formed in a shape that matches the shape of the fifth rib 950 of the cover 9.

The fifth rib 750 is curved such that a region thereof between the end portion 750a and the end portion 750b detours to the rotation axis X1 side in accordance with the shape of the fifth rib 950 of the cover 9.

A through hole 78 penetrating the first region 721 in a thickness direction (rotation axis X1 direction) is provided on an upper side of a region between the fifth rib 750 and the joint portion 712. The through hole 78 allows the motor chamber Sa to communicate with the first gear chamber Sb1 (see FIG. 5).

Further, in the first region 721, the discharge hole 77 is opened between the fifth rib 750 and the sixth rib 760. The discharge hole 77 communicates with a pipe (not shown) provided outside the intermediate case 7. The discharge hole 77 communicates with the oil hole 641 of the motor case 6 via a pipe (not shown) (see FIG. 5).

The sixth rib 760 is provided closer to the rotation axis X1 when viewed from the fifth rib 750. One end portion 760a of the sixth rib 760 is connected to an inner periphery of the fourth rib 740. The sixth rib 760 is connected to the fourth rib 740 below the discharge hole 77 and above the horizontal line HL.

The discharge hole 77 is opened in the vicinity of the end portion 760a of the sixth rib 760 connected to the fourth rib 740. The discharge hole 77 is surrounded by a region of the fourth rib 740 closer to the end portion 740b, a region of the fifth rib 750 closer to the end portion 750a, and a region of the sixth rib 760 closer to the end portion 760a.

The sixth rib 760 extends to the vicinity of the through hole 70. A region of the sixth rib 760 ahead of a bent portion 760c is formed in an arc shape surrounding the through hole 70 with a gap therebetween. The other end portion 760b of the sixth rib 760 is positioned on the vehicle rear side of the vertical line V. In the end portion 760b of the sixth rib 760, a region ahead of the vertical line V is slightly curved in a direction away from the through hole 70 (upward in the drawing). The end portion 760b of the sixth rib 760 is disposed at a position facing the outer periphery of the large gear 33 of the idler gear 3 with a gap therebetween.

A region from the bent portion 760c of the sixth rib 760 to the vertical line V is formed to have a curvature radius larger than that of the second rib 720. Further, this region is provided along the outer periphery of the input gear 23 with a gap larger than a separation distance between the outer periphery of the input gear 23 and the second rib 720.

The sixth rib 760 is formed in a shape that matches the shape of the sixth rib 960 of the cover 9.

The seventh rib 770 extending from the tubular wall portion 791 is connected to a surface of the first rib 710 closer to the vertical line V.

End surfaces of the ribs (first rib 710 to seventh rib 770) described above and the tubular wall portion 791 on the front side of the drawing are positioned on the same plane.

When the gear case 8 and the intermediate case 7 are assembled, the sealing member SL of the cover 9 assembled to the gear case 8 is pressed against the end surfaces of the ribs (first rib 710 to seventh rib 770) and the tubular wall portion 791 on the front side of the drawing. As a result, gaps between joint surfaces of the first rib 710 to the seventh rib 770 and the tubular wall portion 791 of the intermediate case 7 and the first rib 910 to the seventh rib 970 and the tubular wall portion 991 of the cover 9 are sealed.

In the first region 721, an eighth rib 780 is provided on an upper side of the end portion 760b of the sixth rib 760. The eighth rib 780 extends from the inner periphery of the joint portion 712 toward between the sixth rib 760 and the fifth rib 750. The eighth rib 780 is provided with a space from the outer periphery of the large gear 33. The eighth rib 780 is formed to have a height smaller than those of the fifth rib 750 and the sixth rib 760, and a height of the eighth rib 780 protrudes toward the front side of the drawing decreases toward a distal end thereof.

As shown in FIG. 4, the large gear 33 is spline-fitted to the outer periphery of the shaft portion 31 of the idler gear 3. The bearing B3 fitted onto the end portion 31a of the shaft portion 31 are supported by the cylindrical support portion 75 of the wall portion 72 of the intermediate case 7.

As shown in FIG. 12, ribs 751 and 751 are provided on an upper side of the support portion 75 in the gravity direction VL. The ribs 751 and 751 are provided at intervals in a circumferential direction around the rotation axis X2. The ribs 751 and 751 extend linearly in a radial direction of the rotation axis X2 and are connected to the inner periphery of the peripheral wall portion 71.

Oil holes 752 and 752 are formed between the ribs 751 and 751. The oil holes 752 and 752 are opened on an inner periphery of the support portion 75.

Here, hatched regions of the ribs 751 and 751 shown in FIG. 12 have a height in the rotation axis X2 direction smaller than that of the support portion 75, as shown in FIG. 11. Therefore, as shown in FIG. 12, part of the oil OL scraped up by the input gear 23 flows into the inside of the support portion 75 from the oil holes 752 and 752 between the ribs 751 and 751, and lubricates the bearing B3 (see FIG. 4) supported by the support portion 75.

Figure 13:
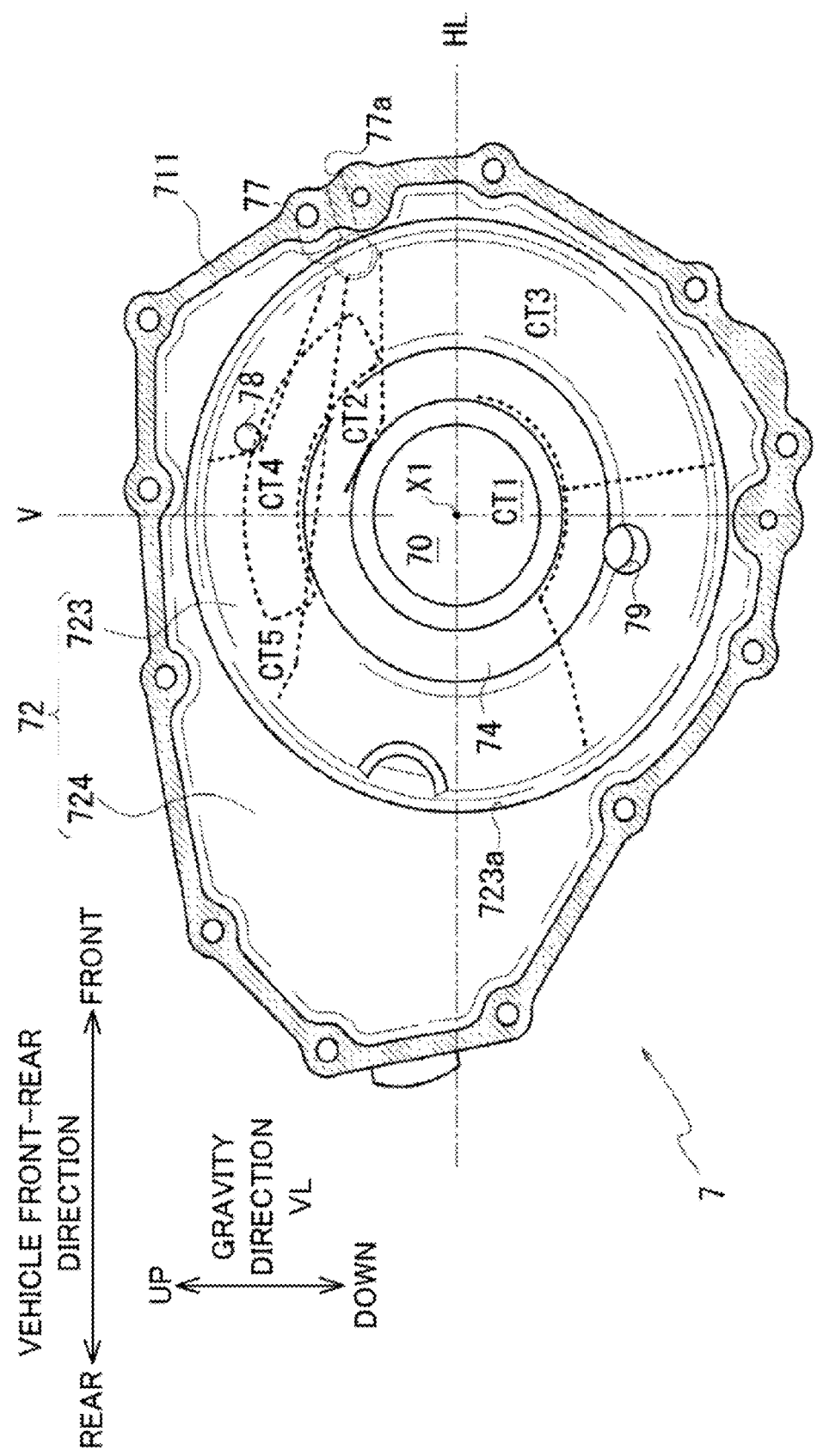
FIG. 13 is a schematic diagram illustrating the catch tank.

FIG. 13 is a plan view of the intermediate case 7 when viewed from the motor case 6. In FIG. 13, a portion (joint portion 711) joined to the motor case 6 is indicated by hatching, and positions of catch tanks CT1 to CT3 positioned closer to the gear case 8 (back side of the drawing) when viewed from the intermediate case 7 and the catch tanks CT4 and CT5 are indicated by broken lines.

As shown in FIG. 13, the intermediate case 7 includes a third region 723, which is a region facing the motor 2, and a fourth region 724, which is a region on a back side of the idler gear 3, closer to the motor case 6 of the wall portion 72.

The third region 723 has a substantially circular shape when viewed from the motor case 6. The third region 723 is positioned on the back side of the drawing with respect to the fourth region 724. An outer periphery 723a of the third region 723 substantially corresponds to an outer periphery of the motor 2 and the outer periphery of the final gear FG.

Therefore, it can be said that the catch tanks CT1 to CT5 have portions overlapping the final gear FG when viewed in the rotation axis X1 direction. Further, when viewed in the rotation axis X1 direction, the catch tanks CT1 to CT5 have portions overlapping the motor 2.

The ring-shaped motor support portion 74 surrounding the through hole 70 is provided at the center of the third region 723.

The through hole 78 is opened on an upper side of the motor support portion 74. The through hole 78 is positioned on the vehicle front side of the vertical line V passing through the rotation axis X1.

The communication hole 79 is opened on a lower side of the motor support portion 74. The communication hole 79 is positioned on the vehicle rear side of the vertical line V passing through the rotation axis X1.

Figure 14:
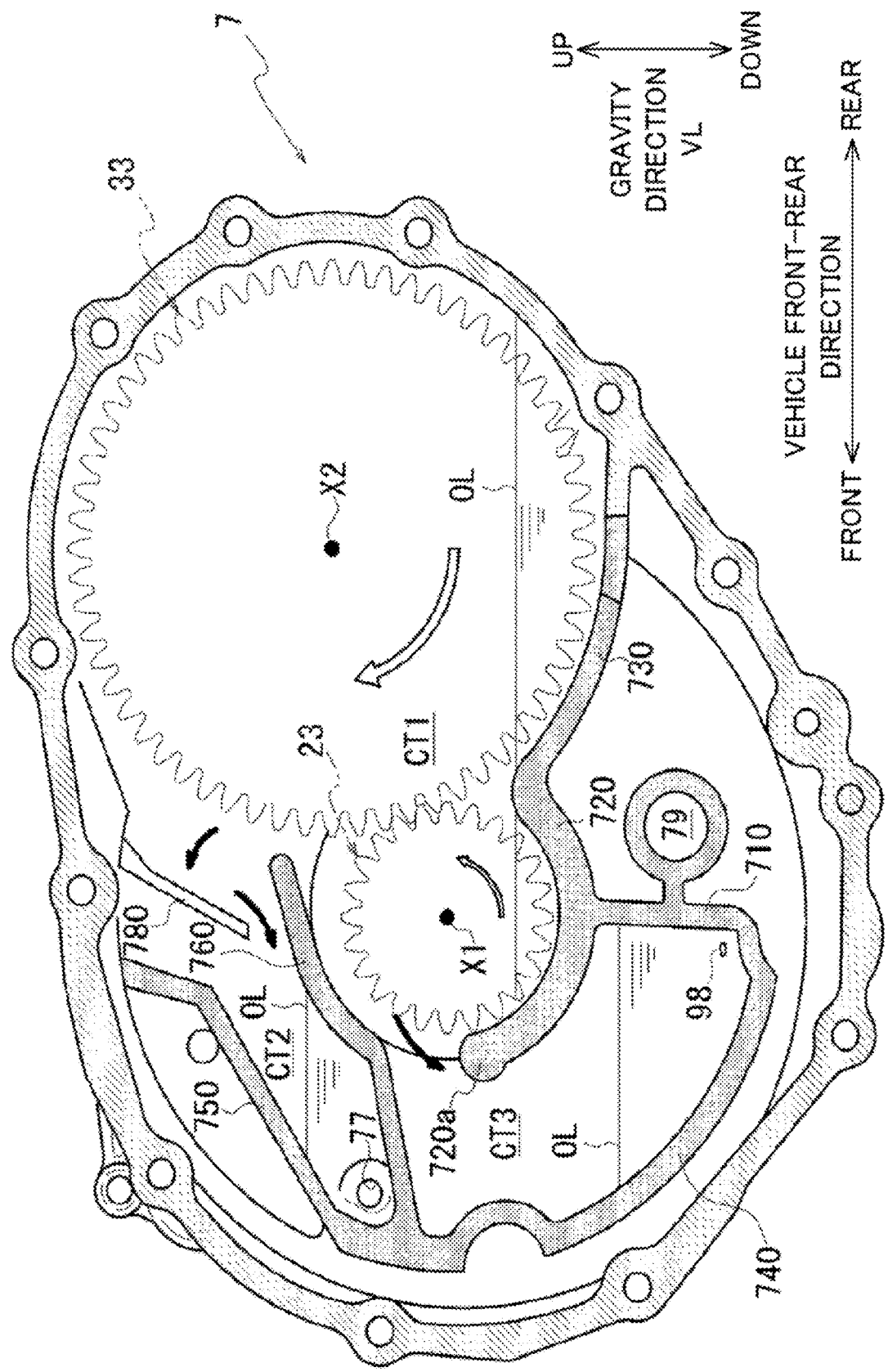
FIG. 14 is a diagram illustrating a function of a discharge hole provided in the catch tank.

FIG. 14 is a schematic diagram illustrating the catch tanks CT1 to CT3 formed around the input gear 23. In FIG. 14, for convenience of explanation, ribs defining the catch tanks CT1 to CT3 are denoted by reference numerals indicating ribs (first rib 710 to sixth rib 760) of the intermediate case 7.

In the actual unit 1, the catch tanks CT1 to CT3 are formed in the second gear chamber Sb2 in the intermediate case 7 by joining the ribs (first rib 910 to sixth rib 960) of the cover 9 and the ribs (first rib 710 to sixth rib 760) of the intermediate case 7.

Figure 15:
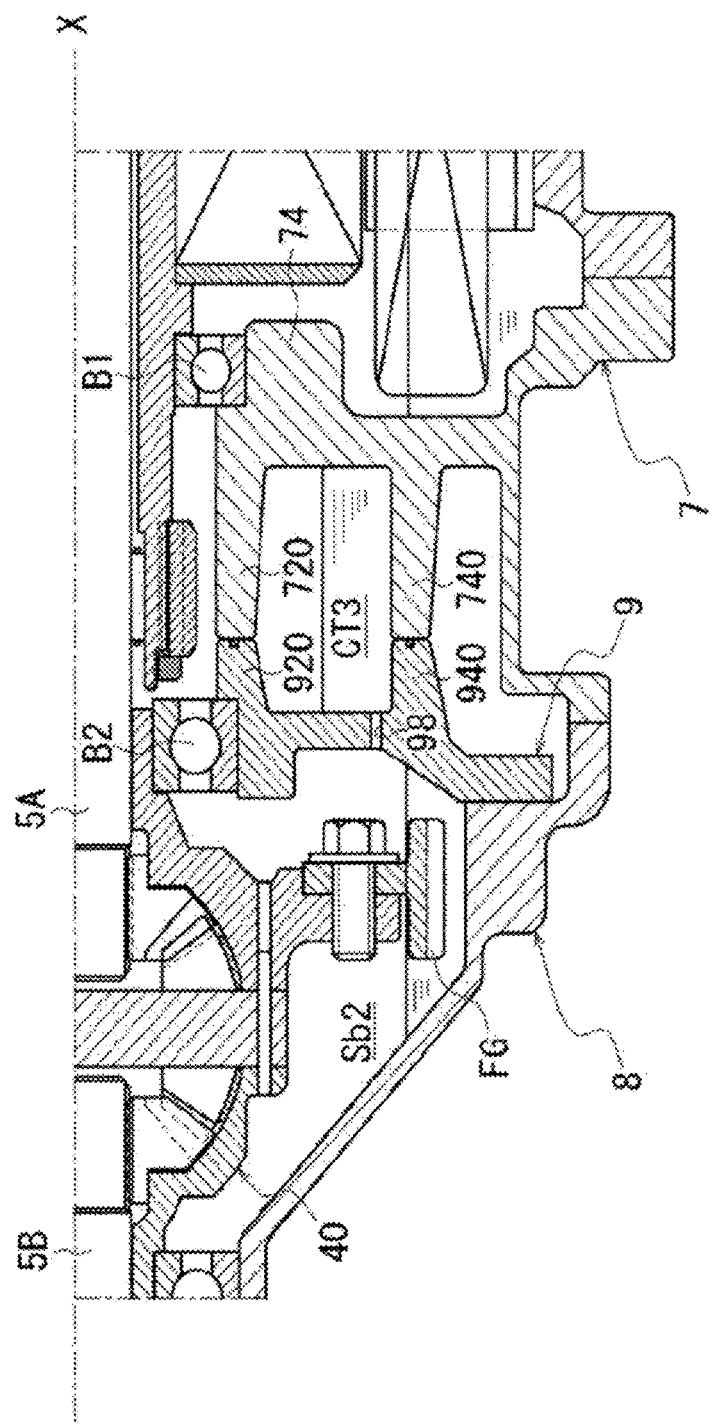
FIG. 15 is a cross-sectional view of the intermediate case.

FIG. 15 is a diagram illustrating a function of the discharge hole 98 provided in the third catch tank CT3.

Figure 16:
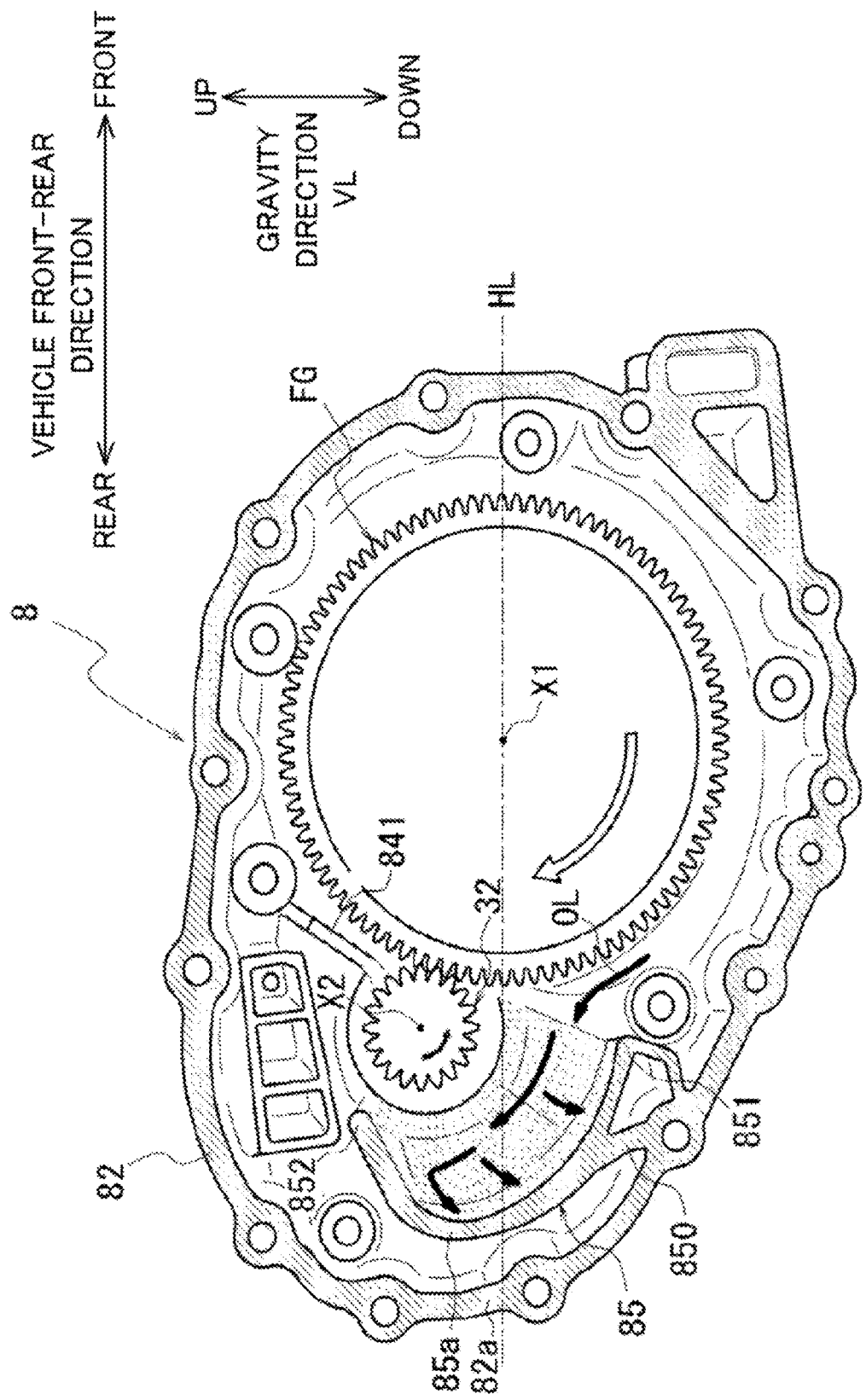
FIG. 16 is a diagram illustrating a flow of oil in the gear case.

FIG. 16 is a plan view of the gear case 8 when viewed from the intermediate case 7.

When the gear case 8 and the intermediate case 7 are assembled, the ribs (first rib 910 to sixth rib 960) of the cover 9 attached to the gear case 8 are pressed against the corresponding ribs (first rib 710 to sixth rib 760) of the intermediate case 7 with the sealing member SL interposed therebetween.

Thus, as shown in FIGS. 2 and 5, the first gear chamber Sb1 is formed between the cover 9 and the wall portion 72 of the intermediate case 7. The first gear chamber Sb1 is a space separated from the motor chamber Sa and the second gear chamber Sb2.

In the first gear chamber Sb1, the large gear 33 of the idler gear 3 and the input gear 23 meshed with the large gear 33 are accommodated.

As shown in FIG. 14, when the first gear chamber Sb1 is viewed from the gear case 8, the ribs (first rib 710 to sixth rib 760) disposed around the large gear 33 and the input gear 23 form the spaces (catch tanks CT1 to CT3) capable of storing the oil OL around the input gear 23.

The second rib 720 and the third rib 730 are formed in an arc shape in which central portions thereof in the longitudinal direction are recessed downward in the gravity direction VL. The second rib 720 and the third rib 730 function as shelves capable of storing the oil OL on upper surfaces thereof. Therefore, the upper surfaces of the second rib 720 and the third rib 730 are regions of the catch tank CT1 capable of storing the oil OL.

Further, above the input gear 23, the fifth rib 750 and the sixth rib 760 are disposed with a gap therebetween in an up-down direction. A space between the fifth rib 750 and the sixth rib 760 serves as the catch tank CT2 having an opening facing the vehicle rear side.

The catch tank CT2 is a substantially arc-shaped space extending from above the input gear 23 to the vehicle front side. When the vehicle equipped with the unit 1 travels forward, the input gear 23 and the large gear 33 rotate in directions of white arrows in the drawing. The rotating large gear 33 scrapes up the oil OL stored in the third rib 730 upward on the vehicle front side.

The catch tank CT2 has an opening facing an upper side of the vehicle rear side, and can receive the oil OL scraped up by the large gear 33. Therefore, most of the oil OL scraped up by the large gear 33 can be collected in the catch tank CT2.

The eighth rib 780 having a distal end facing the inside of the catch tank CT2 is provided closer to the opening of the catch tank CT2. The eighth rib 780 is provided at a position with which the oil OL scraped up by the large gear 33 collides. The eighth rib 780 functions as a guide that guides the colliding oil OL into the catch tank CT2.

The oil OL scraped up by the large gear 33 also reaches the region of the second rib 720 adjacent to the third rib 730. The input gear 23 is positioned above the second rib 720. The sixth rib 760 is positioned above the input gear 23. Due to the position of the sixth rib 760, a moving direction of most of the oil OL scraped up by the input gear 23 that rotates when the vehicle travels forward is limited to the upper side of the vehicle rear side and a lateral side of the vehicle front side.

As shown in FIG. 12, the support portion 75 of the idler gear 3 is positioned on the upper side of the vehicle rear side when viewed from the input gear 23. The oil holes 752 and 752 are opened above the support portion 75 between the ribs 751 and 751.

Therefore, the oil OL fed to the upper side of the vehicle rear side lubricates the bearing B3 (see FIG. 4) supported on the inner periphery of the support portion 75 through the oil holes 752 and 752.

As shown in FIG. 14, a space surrounded by the first rib 710, the second rib 720, the fourth rib 740, and the sixth rib 760 is formed on the vehicle front side when viewed from the input gear 23. The end portion 720a of the second rib 720 is provided at a distance from the sixth rib 760. Therefore, the space surrounded by the ribs serves as the catch tank CT3 having an opening facing the vehicle rear side. As a result, the oil OL fed to the vehicle front side by the input gear 23 is collected by the catch tank CT3.

As shown in FIG. 15, in the cover 9 positioned closer to the gear case 8 (left side in the drawing) with respect to the catch tank CT3, the discharge hole 98 is opened at a position facing a lower side of the catch tank CT3. An opening diameter of the discharge hole 98 is sufficiently smaller than an opening diameter (gap between the end portion 720a of the second rib 720 and the sixth rib 760 shown in FIG. 14) of the opening of the catch tank CT3. Therefore, the oil OL collected in the catch tank CT3 is gradually returned to the second gear chamber Sb2.

As a result, in the first gear chamber Sb1, the spaces (catch tanks CT1 to CT3) in which the oil OL can be collected are formed around the input gear 23.

As shown in FIG. 13, the catch tanks CT1 to CT3 are formed within a range of an outer diameter of the motor 2 (within a range of the outer periphery 723a of the third region 723). The catch tanks CT1 to CT3 are provided at positions overlapping the motor 2 when viewed from the rotation axis X1 direction together with the catch tanks CT4 and CT5.

Further, the catch tanks CT1 to CT3 are provided at overlapping positions when viewed from the radial direction of the rotation axis X1. The catch tanks CT1 to CT3 are accommodated in a limited range (range of the first gear chamber Sb1) in the rotation axis X1 direction.

As shown in FIG. 5, the tubular wall portion 791 surrounding the communication hole 79 is joined to the tubular wall portion 991 surrounding the communication hole 99 of the cover 9. As a result, a tunnel that directly communicates the motor chamber Sa with the second gear chamber Sb2 of the gear chamber Sb is formed inside the tubular wall portion 791 and the tubular wall portion 991 that are joined to each other.

The through hole 78 through which the motor chamber Sa and the gear chamber Sb communicate with each other is provided in an upper portion of the intermediate case 7. Therefore, a height of the oil OL in the motor chamber Sa and a height of the oil OL in the gear chamber Sb can be maintained substantially the same.

The operation of the unit 1 of the present embodiment will be described.

As shown in FIGS. 1 and 2, in the unit 1, the gear train (idler gear 3 and final gear FG) and the differential device 4 (bevel gears 42A and 42B and side gears 43A and 43B) are provided on the transmission path of the output rotation of the motor 2.

When the vehicle equipped with the unit 1 travels, the output rotation of the motor 2 is input to the idler gear 3 via the input gear 23 that rotates integrally with the motor shaft 20 and the large gear 33 that meshes with the input gear 23.

When the output rotation of the motor 2 is input to the idler gear 3 via the large gear 33, the small gear 32 rotates about the rotation axis X2 together with the large gear 33.

Thus, since the final gear FG with which the small gear 32 meshes so as to be capable of transmitting rotation is fixed to the differential case 40, the differential case 40 rotates about the rotation axis X1 as the idler gear 3 rotates about the rotation axis X2.

Here, in the idler gear 3, the outer diameter R32 of the small gear 32 is smaller than the outer diameter R33 of the large gear 33 (see FIG. 4). In the idler gear 3, the large gear 33 serves as an input portion of the output rotation of the motor 2, and the small gear 32 serves as an output portion of the input rotation.

Therefore, the rotation input to the idler gear 3 is greatly decelerated and then output to the differential case 40.

As shown in FIG. 5, when the vehicle equipped with the unit 1 is not traveling, a height of the oil OL in the housing HS is such that a lower part of the differential case 40 is submerged in the oil OL.

When the vehicle starts traveling, the differential case 40 to which the output rotation of the motor 2 is transmitted rotates about the rotation axis X1. Thus, the differential case 40 and the final gear FG rotating integrally with the differential case 40 scrape up the oil OL in the second gear chamber Sb2.

When the vehicle travels forward, the oil OL scraped up by the final gear FG moves upward from the vehicle rear side.

As shown in FIG. 3, in the upper portion of the gear case 8, the opening 870a of the catch tank CT4 and the catch tank CT5 closer to the cover 9 are positioned on one side and the other side with the final gear FG interposed therebetween.

Therefore, the oil OL that is scraped up by the final gear FG and collides with the upper wall portion 811a of the gear case 8 moves toward the catch tank CT4 on one side and the catch tank CT5 on the other side in the rotation axis X1 direction.

The oil OL flowing into the catch tank CT4 stays in the catch tank CT4 as the lower part of the opening 870a of the catch tank CT4 is closed by the plate 88.

The plate 88 that closes a part of the opening 870a of the catch tank CT4 is provided with the discharge port 883 for the oil OL (see FIG. 7). The opening diameter of the discharge port 883 is sufficiently smaller than the opening area of the opening 870a of the catch tank CT4. Therefore, the amount of the oil OL discharged from the discharge port 883 is smaller than the amount of the oil OL flowing into the catch tank CT4.

Thus, the oil OL collected in the catch tank CT4 is gradually returned from the discharge port 883 into the gear case 8 (second gear chamber Sb2).

That is, when the vehicle travels, the oil OL scraped up by the final gear FG stays in the catch tank CT4, and the amount of the oil OL returned to the second gear chamber Sb2 of the gear chamber Sb decreases.

Further, as shown in FIG. 3, the differential case 40 is positioned directly below the discharge port 883. Therefore, part of the oil OL discharged from the discharge port 883 enters the inside of the differential case 40 from the opening of the differential case 40 rotating about the rotation axis X1. As a result, meshing portions between the bevel gears 42A and 42B and the side gears 43A and 43B are lubricated.

As shown in FIG. 9, of the oil OL scraped up by the final gear FG, the oil flowing into the catch tank CT5 flows along the partition wall 96 and is discharged from the discharge hole 971 to the first gear chamber Sb1 on the back side of the drawing.

As shown in FIG. 11, since the discharge hole 971 communicates with the catch tank CT2, the oil collected in the catch tank CT5 flows into the catch tank CT2. Thus, of the oil OL scraped up by the final gear FG, the amount of the oil OL returned to the second gear chamber Sb2 decreases by the amount of the oil OL collected by the catch tank CT5.

As shown in FIG. 14, the discharge hole 77 is opened in the catch tank CT2. As shown in FIG. 5, the discharge hole 77 communicates with the oil hole 641 in the motor case 6 via a pipe (not shown) provided along the outer periphery of the housing HS.

In the motor support portion 64, the oil hole 641 is opened in a region between the bearing B1 and the lip seal RS. Therefore, the oil OL discharged from the oil hole 641 lubricates the bearing B1 and then moves toward a lower part of the motor chamber Sa. Thus, the motor 2 is cooled by the oil OL flowing into the lower part of the motor chamber Sa.

As shown in FIG. 16, when the vehicle travels, part of the oil OL scraped up by the final gear FG moves upward inside the gear case 8.

The catch guide 85 is provided on the vehicle rear side of the final gear FG. When the vehicle travels forward, part of the scraped-up oil OL moves upward along the inner periphery of the catch guide 85.

The oil OL that moves upward along the inner periphery of the catch guide 85 is prevented from moving by a region of the catch guide 85 closer to the end portion 852.

Here, as shown in FIG. 4, the catch guide 85 is curved such that the separation distance h1 from the outer periphery of the small gear 32 increases toward the end portion 85a closer to the large gear 33, in the cross-sectional view along the rotation axis X2.

Therefore, the moving direction of the oil OL which is prevented from moving by the region of the catch guide 85 closer to the end portion 852 is changed to a direction from the small gear 32 toward the large gear 33.

Further, since the rotation direction of the small gear 32 is opposite to that of the final gear FG, the moving direction of part of the oil OL moving upward along the inner periphery of the catch guide 85 is changed to a direction from the small gear 32 toward the large gear 33 by the rotating small gear 32.

Here, as shown in FIG. 4, the end portion 85a of the catch guide 85 closer to the large gear 33 reaches the outer diameter side of the cover 9. When viewed in the radial direction of the rotation axis X1, the end portion 85a of the catch guide 85 and the cover 9 are in an overlapping position.

Therefore, most of the oil OL that moves along the inner periphery of the catch guide 85 to the large gear 33 flows into the first gear chamber Sb1 (catch tank CT1) where the large gear 33 is positioned.

As shown in FIG. 14, the oil OL that reaches the first gear chamber Sb1 first flows into an upper surface of the third rib 730 and stays thereon.

The oil OL staying on the third rib 730 is scraped up by the large gear 33 rotating about the rotation axis X2 and moves toward the vehicle front side and obliquely upward on the vehicle front side.

On an upper side of the vehicle front side when viewed from the large gear 33, the opening of the catch tank CT2 faces upward on the vehicle rear side. Therefore, most of the oil OL scraped up by the large gear 33 is collected by the catch tank CT2. Since an opening diameter of the catch tank CT2 is larger than an opening diameter of the discharge hole 77, when the vehicle travels, the amount of the oil OL staying in the catch tank CT2 is larger than the amount of the oil OL discharged from the discharge hole 77.

The oil OL discharged from the discharge hole 77 is discharged from the oil hole 641 in the motor case 6 into the motor chamber Sa to be used for cooling the motor 2.

The oil OL scraped up by the large gear 33 also reaches the region of the second rib 720 adjacent to the third rib 730. Thus, the input gear 23 that rotates when the vehicle travels scrapes up the oil OL staying on the second rib 720.

Here, the input gear 23 is positioned above the second rib 720, and the sixth rib 760 is positioned above the input gear 23.

When the vehicle travels forward, the input gear 23 rotates in a counterclockwise direction shown in FIG. 14. At this time, since the sixth rib 760 is positioned above the input gear 23, the oil OL scraped up by the input gear 23 moves upward on the vehicle rear side and moves toward the lateral side of the vehicle front side.

As shown in FIG. 12, the oil holes 752 and 752 are opened above the support portion 75 of the idler gear 3 on the upper side of the vehicle rear side when viewed from the input gear 23. Therefore, the oil OL fed to the upper side of the vehicle rear side lubricates the bearing B3 (see FIG. 4) supported on the inner periphery of the support portion 75 through the oil holes 752 and 752.

As shown in FIG. 14, the catch tank CT3 is positioned on the vehicle front side when viewed from the input gear 23. The catch tank CT3 is surrounded by the first rib 710, the second rib 720, the fourth rib 740, and the sixth rib 760. The opening of the catch tank CT3 faces the vehicle rear side. Therefore, the oil OL which is scraped up by the input gear 23 and moves toward the vehicle front side flows into the catch tank CT3.

As shown in FIG. 15, in the cover 9 positioned closer to the gear case 8 (left side in the drawing) with respect to the catch tank CT3, the discharge hole 98 is opened at the position facing the lower side of the catch tank CT3. The opening diameter of the discharge hole 98 is sufficiently smaller than the opening diameter (gap between the end portion 720a of the second rib 720 and the sixth rib 760) of the opening of the catch tank CT3. Further, the discharge hole 98 has an opening area smaller than that of the discharge hole 77 (see FIG. 14).

Therefore, the oil OL collected in the catch tank CT3 is gradually returned to the second gear chamber Sb2 of the gear chamber Sb.

Further, when the vehicle travels, the amount of the oil OL staying in the catch tank CT2 is larger than the amount of the oil OL discharged from the discharge hole 77. Further, the amount of the oil OL supplied from the discharge hole 77 to the motor chamber Sa is larger than the amount of the oil OL returned from the discharge hole 98 to the second gear chamber Sb2.

As a result, the supply of the oil OL to the motor chamber Sa for cooling the motor 2 is prioritized over the return of the oil OL to the second gear chamber Sb2.

As described above, when the vehicle travels, the oil OL scraped up by the rotating final gear FG stays in the catch tanks CT4 and CT5 or the catch tanks CT1 to CT3, and the amount of the oil OL returning to the second gear chamber Sb2 of the gear chamber Sb is reduced.

Therefore, a height of the oil OL in the second gear chamber Sb2 decreases, and the resistance to the rotating final gear FG decreases.

Further, as shown in FIG. 5, in a lower part of the housing HS, a tunnel that directly communicates the motor chamber Sa with the second gear chamber Sb2 of the gear chamber Sb is formed inside the tubular wall portion 791 and the tubular wall portion 991 joined to each other with connecting the communication hole 79 and the communication hole 99 in series.

The through hole 78 serving as an air movement hole is opened in an upper portion of the housing HS. Therefore, the tunnel exhibits a function of making the height of the oil in the motor chamber Sa substantially the same as the height of the oil in the second gear chamber Sb2.

In the present embodiment, the position of the tunnel is set such that a lower end 791a of the tunnel connecting the communication holes 79 and 99 in series is positioned below the air gap CL (see FIG. 2 as well). Here, the air gap CL is a gap between the inner periphery 222c of the teeth portion 222 of the stator core 22 and the outer periphery 21c of the rotor core 21.

Therefore, in the case where the oil OL stays in the catch tanks CT4 and CT5 or the catch tanks CT1 to CT3 when the vehicle travels, the height of the oil OL in the motor chamber Sa can be set below the air gap CL.

If the oil OL exists up to the air gap CL, the oil OL acts as resistance to the rotation of the rotor core 21. Since the resistance against the rotation of the rotor core 21 can be reduced, an improvement in the power consumption (electricity cost) of the vehicle equipped with the unit 1 can be expected.

In the case of an electric vehicle equipped with the unit 1, the improvement in the electricity cost can be expected to increase a travel distance on a single charge.

As described above, part of the oil OL staying in the catch tank CT2 is supplied into the motor chamber Sa for cooling the motor 2.

As described above, the oil OL for cooling is supplied from the catch tank CT2 to the motor chamber Sa. In the motor chamber Sa, the stator core 22 of the motor is inserted into the inner periphery of the peripheral wall portion 61 of the motor case 6 from the intermediate case 7.

The lower space of the motor chamber Sa is divided into the space on one side (first space Sa1) and the space on the other side (second space Sa2) with the yoke portion 221 interposed therebetween. Since the stator core 22 is positioned between the first space Sa1 and the second space Sa2, it is difficult for the oil OL to move between the first space Sa1 and the second space Sa2.

The communication groove 65 is provided in the lower region of the peripheral wall portion 61 in the gravity direction VL, more preferably, in the lowermost region. As a result, the oil OL can move between the first space Sa1 and the second space Sa2 through the communication groove 65. Therefore, the oil OL can easily move between the first space Sa1 and the second space Sa2.

As described above, by causing the oil OL to stay in the catch tanks CT4 and CT5 or the catch tanks CT1 to CT3 when the vehicle travels, the height of the oil OL in the second gear chamber Sb2 is reduced to reduce the resistance to the rotation of the final gear FG.

Further, the position of the tunnel is set such that a lower limit of the tunnel connecting the communication holes 79 and 99 in series is positioned below the air gap CL, and the height of the oil OL in the motor chamber Sa is set below the air gap CL when the vehicle travels. This reduces the resistance to the rotation of the rotor core 21.

The oil OL is allowed to move between the first space Sa1 and the second space Sa2 via the communication groove 65, thereby facilitating the movement of the oil OL between the first space Sa1 and the second space Sa2.

As a result, even if the height of the oil OL at the lower part of the housing HS is reduced when the vehicle travels, the oil OL can be smoothly circulated between the motor chamber Sa and the second gear chamber Sb2.

As described above, the unit 1 according to the present embodiment has the following configuration.

(1) The unit 1 includes the housing HS that accommodates the final gear FG (gear) connected to the motor 2.

The housing HS includes the catch tanks CT1 to CT5 therein.

The final gear FG rotates integrally with the differential case 40 about the rotation axis X1.

When viewed from the rotation axis X1 direction, the catch tanks CT1 to CT5 have portions overlapping the final gear FG.

When viewed from the rotation axis X1 direction, the catch tanks CT1 to CT5 have portions overlapping the motor 2.

With such a configuration, for example, as shown in FIG. 13, the catch tanks CT1 to CT5 are disposed on an inner diameter side of the outer periphery 723a of the third region 723. The outer periphery 723a substantially corresponds to the outer periphery of the motor 2 and the outer periphery of the final gear FG.

As a result, the catch tanks CT1 to CT5 can be installed without greatly protruding from the motor 2 and the final gear FG in the radial direction of the rotation axis X1.

As a result, it is possible to prevent an increase in the dimension of the unit 1 in the radial direction.

(2) When viewed from the gravity direction VL, the final gear FG has a portion positioned between the differential case 40 and the motor 2.

The final gear FG has a portion positioned between the catch tank CT4 and the motor 2 when viewed from the gravity direction VL.

As shown in FIG. 2, on one side (right side in the drawing) of the differential case 40 closer to the motor 2, the outer diameter in the radial direction orthogonal to the rotation axis X1 decreases toward the motor 2.

Therefore, there is a space closer to the motor 2 that can be effectively used when viewed from the differential case 40. By disposing the final gear FG in this space, the space around the differential case 40 can be effectively used. This improves the layout of the final gear FG and other components in the unit 1.

(3) The catch tanks CT4 and CT5 face the final gear FG in the rotation axis X1 direction.

The inner wall portion 871, which is the bottom surface of the catch tank CT4, has a portion that is inclined obliquely so as to be positioned downward in the gravity direction toward the vehicle front side (see FIG. 7).

The partition wall 96, which is a bottom surface of the catch tank CT5, has a portion that is inclined obliquely so as to be positioned downward in the gravity direction toward the vehicle front side (see FIGS. 8 and 9).

Considering a rotation direction of the final gear FG when the vehicle equipped with the unit 1 travels forward, the oil OL scraped up by the final gear FG scatters with a vector toward the front of the vehicle.

Since the inner wall portion 871 and the partition wall 96, which are the bottom surfaces of the catch tanks CT4 and CT5, have the obliquely inclined portions so as to be positioned downward in the gravity direction toward the vehicle front side, the movement of the scattered oil OL toward the vehicle front side can be promoted.

Since the scattered oil can be smoothly moved in the catch tanks CT4 and CT5, the oil OL scraped up when the vehicle travels can be smoothly stored in the catch tanks CT4 and CT5.

(4) The unit 1 includes the housing HS that accommodates the final gear FG (gear) connected to the motor 2.

The housing HS includes therein at least two catch tanks capable of storing the oil OL.

The final gear FG rotates integrally with the differential case 40 about the rotation axis X1.

When viewed from the rotation axis X1 direction, the two catch tanks have portions overlapping the motor 2.

For example, any two catch tanks selected from the catch tanks CT1 to CT5 are provided at positions overlapping the final gear FG and the motor 2 when viewed from the rotation axis X1 direction.

With such a configuration, any two catch tanks can be installed without greatly protruding from the motor 2 and the final gear FG in the radial direction of the rotation axis X1.

As a result, it is possible to prevent an increase in the dimension of the unit 1 in the radial direction.

By providing at least two catch tanks capable of storing the oil OL in the housing HS, it is possible to increase the amount of the oil OL that can be temporarily collected when the vehicle equipped with the unit 1 travels. As a result, since the height of the oil OL in the housing HS can be reduced, it is possible to prevent the oil in the housing HS from acting as a friction against the rotation of the final gear FG and the rotor core 21 rotating about the rotation axis X1.

That is, the stirring resistance of the rotor can be reduced. In this case, since a reduction in the load on the motor 2 can be expected, an improvement in the electricity cost of the vehicle equipped with the unit 1 can be expected. In addition, a reduction in energy loss in the output rotation of the motor 2 can be expected.

By providing at least two catch tanks capable of storing the oil OL in the housing HS, the degree of freedom of lubrication design in the unit 1 is increased. For example, the two catch tanks can be provided with different functions, such as collecting the oil OL for lubricating the motor 2 and collecting the oil OL for lubricating the final gear FG and the idler gear 3.

(5) At least two catch tanks capable of storing the oil OL have portions sandwiched between the motor 2 and the final gear FG in the rotation axis X1 direction.

For example, the catch tanks CT1 to CT3 are positioned between the motor 2 and the final gear FG in the rotation axis X1 direction.

The small-diameter input gear 23 and the large-diameter large gear 33 are positioned between the motor 2 and the final gear FG, and there is a spatial margin around the input gear 23.

With the configuration described above, the space between the final gear FG and the motor 2 in the rotation axis X1 direction can be effectively used, and the layout is improved.

(f) The unit 1 includes the housing HS that accommodates the final gear FG (gear) connected to the motor 2, and the cover 9 having a portion sandwiched between the final gear FG and the motor 2.

The housing HS includes the catch guide 85 therein.

The catch guide 85 has an opening that opens toward the final gear FG.

When viewed in the radial direction of the rotation axis X1, the catch guide 85 has a portion overlapping a side surface of the cover 9 in the radial direction.

As shown in FIG. 16, the catch guide 85 is provided so as to surround the outer periphery of the small gear 32 meshing with the final gear FG. The catch guide 85 is provided in a range from the vehicle rear side to the lower side when viewed from the small gear 32, and has an opening facing the front of the vehicle closer to the final gear FG.

When the vehicle equipped with the unit 1 travels forward, the oil OL scraped up by the final gear FG moves toward the catch guide 85 through a region between the cover 9 and the final gear FG in the rotation axis X1 direction. Therefore, for example, the moving direction of the oil OL can be controlled by the catch guide 85 portion by adjusting the shape of the catch guide 85. As a result, the degree of freedom of lubrication design in the unit 1 is improved.

For example, when the vehicle equipped with the unit 1 travels forward, the oil OL scraped up by the final gear FG is continuously supplied toward the catch guide 85.

The catch guide 85 is formed in an arc shape so as to surround the rotation axis X2 of the small gear 32 with a gap therebetween, and the one end portion 851 in the circumferential direction around the rotation axis X2 is positioned below the rotation axis X2 in the gravity direction VL and is curved in a shape capable of storing the oil OL on an upper surface thereof. Therefore, a certain amount of oil OL stays on a surface (surface facing small gear 32) of the catch guide 85. Therefore, when the vehicle equipped with the unit 1 travels, the catch guide 85 portion can be used to reduce the height of the oil OL in the unit 1. That is, lubrication design options aimed at lowering an oil level within the housing HS increase.

For example, it is possible to buy time for the oil OL that moves to a back side (closer to motor 2) of the cover 9 or the oil OL that is scraped up by the final gear FG to return to a front side (second gear chamber Sb2) of the cover 9. As a result, lubrication design options aimed at lowering the oil level within the housing HS increase. For example, since the oil can be directed to an object to be lubricated positioned on the back side (closer to motor 2) of the cover 9, lubrication design options increase.

(g) A bottom surface of the catch guide 85 has a portion that is inclined downward toward the end portion 85a closer to the cover 9.

As shown in FIG. 4, the bottom surface of the catch guide 85, which is a surface facing the small gear 32, is curved such that the separation distance h1 from the outer periphery of the small gear 32 increases toward the end portion 85a closer to the large gear 33. Therefore, the oil OL that reaches the catch guide 85 can be moved in the rotation axis X2 direction and guided to the large gear 33.

(h) The unit 1 includes the idler gear 3 including the large gear 33 and the small gear 32.

The small gear 32 meshes with the final gear FG. When viewed in the radial direction, the catch guide 85 has a portion surrounding the small gear 32.

With such a configuration, the small gear 32 has a portion accommodated in the catch guide 85 (a portion in which lateral side thereof is covered), which contributes to preventing an increase in the dimension of the unit 1.

(i) The catch guide 85 has, on the vehicle rear side, a portion that is positioned above a horizontal plane (horizontal line HL) passing through the rotation axis X1 which is an axis of the motor shaft 20 (output shaft) of the motor 2 and orthogonal to the gravity direction VL.

The other end portion 852 of the catch guide 85 in the circumferential direction around the rotation axis X2 is positioned above the horizontal line HL in the gravity direction VL, on the vehicle rear side when viewed from the small gear 32.

As a result, the moving direction of the oil OL that moves toward the vehicle rear side along the inner periphery of the catch guide 85 can be changed from the upward direction to the moving direction along the rotation axis X2 by the region of the catch guide 85 closer to the end portion 852.

As a result, it is possible to promote scattering of the oil OL that reaches the catch guide 85 in the rotation axis X2 direction. The region of the catch guide 85 closer to the end portion 852 is disposed above the rotation axis X2 in the gravity direction VL while a curvature radius thereof is reduced. Therefore, the moving direction of the oil OL moving along the inner periphery of the catch guide 85 can be changed to a direction in which the oil OL moves along the rotation axis X2 using gravity, and this change of the direction can be promoted. As a result, the oil feeding efficiency in the axial direction is improved.

(j) In the housing HS, ribs (second ribs 720 and 920 and third ribs 730 and 930) functioning as shelves capable of collecting the oil OL are provided in a region sandwiched between the cover 9 and the motor 2 in the rotation axis X1 direction (see FIG. 11).

The oil OL whose moving direction is changed to the rotation axis X2 direction by the catch guide 85 is supplied to and stored in the ribs functioning as shelves through a region of the wall portion 713 of the intermediate case 7 (see FIG. 11).

In the housing HS, the oil OL is supplied to the catch tanks CT2 and CT3, and the bearing B3 (see FIGS. 4, 12, and 14) via upper sides of the ribs functioning as shelves.

The catch tanks CT2 and CT3, and the bearing B3 are provided between the motor 2 and the final gear FG when viewed from a vehicle traveling direction (vehicle front-rear direction).

With such a configuration, a space on the back side (closer to motor 2) of the cover 9 can be used for collection and usage of the oil OL. As a result, this lubrication design makes effective use of the space behind the cover.

- (k) The unit 1 includes the motor case 6 that accommodates the motor 2, the gear case 8 that accommodates the final gear FG connected to the motor 2, and the cover 9 having a portion sandwiched between the final gear FG and the motor 2.

The motor case 6 communicates with the gear case 8 via the communication holes 79 and 99 as an opening of the cover 9.

The opening is positioned below a horizontal plane (horizontal line HL) that passes through the rotation axis X1 which is an axis of the final gear FG and is orthogonal to the gravity direction VL.

When the vehicle equipped with the unit 1 travels, since the final gear FG rotating about the rotation axis X1 scrapes up the oil in the gear case 8 (second gear chamber Sb2), an oil level in the second gear chamber Sb2 decreases.

As shown in FIG. 5, when the motor chamber Sa in the motor case 6 and the second gear chamber Sb2 in the gear case 8 communicate with each other via the communication holes 79 and 99 as the opening, the oil in the motor chamber Sa flows into the second gear chamber Sb2 through the opening. That is, as the oil level in the gear case 8 decreases, an oil level in the motor case 6 (motor chamber Sa) also decreases. That is, a mechanism capable of adjusting the oil level in the motor case 6 (motor chamber Sa) is provided.

- (l) In the opening, the gear case 8 and the motor case 6 communicate with each other via a tunnel in which the communication holes 79 and 99 are connected in series.

With such a configuration, when the motor case 6 is considered as a reference, the opening serves as an outlet of the oil OL to the gear case 8. By providing a tunnel that does not communicate with the first gear chamber Sb1, the inlet of the tunnel can be brought closer to the motor 2. By providing the opening, the oil OL moves smoothly between the motor case 6 (motor chamber Sa) and the gear case 8 (second gear chamber Sb2) through the tunnel.

In particular, after being scraped up by the final gear FG, the oil OL supplied to the motor chamber Sa via the catch tank CT2 is returned to the second gear chamber Sb2 through the tunnel, so that the oil OL can be smoothly circulated inside the housing HS.

- (m) The wall portion 72 (wall) has a portion positioned between the cover 9 and the motor 2.

The tunnel includes the tubular wall portion 991 (cover tunnel: wall protruding portion) protruding from the cover 9 in the rotation axis X1 direction, and the tubular wall portion 791 (wall tunnel: wall protruding portion) protruding from the wall portion 72 in the rotation axis X1 direction.

The tunnel includes the sealing member SL interposed at a joint surface between the tubular wall portion 991 and the tubular wall portion 791.

With such a configuration, the oil OL passing through the tunnel connecting the communication holes 79 and 99 in series can be suitably prevented from leaking to the outside (first gear chamber Sb1). This improves the accuracy of the lubrication design.

- (n) The motor 2 includes the stator core 22 (stator) and the rotor core 21 (rotor) positioned inside the inner periphery of the stator core 22.

When viewed from the rotation axis X1 direction of the motor 2, a lower end of the opening (lower end 791*a* of the tunnel) is positioned on the outer peripheral side of the inner periphery 222*c* of the stator core 22 (see FIG. 5).

The position of the tunnel is set such that the lower end 791*a* (see FIG. 5) of the tunnel connecting the communication holes 79 and 99 in series is positioned below the air gap CL between the inner periphery 222*c* of the teeth portion 222 of the stator core 22 and the outer periphery 21*c* of the rotor core 21.

When oil enters the air gap CL between the stator core 22 and the rotor core 21, the entering oil acts as a friction against the rotation of the rotor core 21, leading to an increase in rotational resistance of the motor 2.

When the lower end 791*a* of the tunnel is set at the position described above, the oil level in the motor chamber Sa can be adjusted to a position lower than the air gap CL. This contributes to reducing the rotational resistance of the motor 2.

- (o) The motor case 6 includes the oil hole 641 through which the oil OL collected in the catch tank CT2 is supplied.

The motor 2 has a portion (yoke portion 221 of stator core 22) positioned between the oil hole 641 and the cover 9 when viewed from the gravity direction VL.

The yoke portion 221 of the stator core 22, which is an outer peripheral surface of the motor 2, has a portion that contacts an inner peripheral surface of the peripheral wall portion 61 of the motor case 6.

The communication groove 65 along the rotation axis X1 direction is provided on the inner peripheral surface of the peripheral wall portion 61 of the motor case 6 below the motor 2 in the gravity direction VL.

The lower space of the motor chamber Sa is divided into the space on one side (first space Sa1) and the space on the other side (second space Sa2) with the yoke portion 221 interposed therebetween. The stator core 22 is positioned between the first space Sa1 and the second space Sa2, and the stator core 22 is in contact with the inner peripheral surface of the peripheral wall portion 61 to enhance the support stability at the peripheral wall portion 61.

Therefore, it is difficult for the oil OL to move between the first space Sa1 and the second space Sa2.

When the oil OL for cooling the motor 2 is supplied to the motor chamber Sa via the oil hole 641, it may be difficult for the supplied oil OL to return to the second gear chamber Sb2.

As described above, when the communication groove 65 is provided in the lower region of the peripheral wall portion 61 in the gravity direction VL, more preferably, in the lowermost region, the oil OL can move between the first space Sa1 and the second space Sa2 through the communication groove 65.

The communication groove 65 can increase a flow rate of the oil OL between the front and back of the motor 2 (between first space Sa1 and second space Sa2). This improves the accuracy of adjusting the oil level in the second space Sa2.

- (p) The housing HS (housing member) includes the wall portion 72 (wall) having a portion sandwiched between the final gear FG (gear) and the motor 2 (see FIG. 2).

(q) The cover 9 has a portion sandwiched between the wall portion 72 (wall) and the final gear FG.

For example, a gear that rotates integrally with the differential case 40 scrapes up a large amount of the oil OL. For example, in the case of the embodiment described above, the final gear FG that rotates integrally with the differential case 40 is suitable as a gear.

When a planetary gear mechanism is adopted instead of the idler gear 3, a large pinion or the like of a stepped pinion gear of the planetary gear mechanism rotating (revolving) integrally with the differential case 40 is preferably used as a gear.

(r) The wall portion 72 of the intermediate case 7 has wall protruding portions (first rib 710 to seventh rib 770 and tubular wall portion 791) protruding along the rotation axis X1 direction.

The cover 9 includes cover protruding portions (first rib 910 to seventh rib 970 and tubular wall portion 991) protruding along the rotation axis X1 direction (see FIG. 11).

(s) A bottom surface portion of the catch tank CT1 and/or the catch tank CT2 includes at least the wall protruding portion and the cover protruding portion.

(t) The bottom surface portion of the catch tank CT1 and/or the catch tank CT2 includes at least the cover protruding portion.

By adding the cover 9, a catch tank can be easily formed between the motor 2 and the final gear FG.

(u) For example, the cover 9 is used to support the bearing B2 in addition to forming a catch tank. In this case, the cover 9 is provided with a plurality of functions, which contributes to a reduction in the number of components.

(v) The catch tank CT2 has the discharge hole 77 (first hole) directed toward the motor 2. The discharge hole 77 is connected to an oil passage extending toward the motor 2. The oil passage extending toward the motor 2 is a pipe (not shown) provided outside the intermediate case 7. The discharge hole 77 communicates with the oil hole 641 of the motor case 6 via a pipe (not shown) (see FIG. 5).

(w) The catch tank CT3 has a second hole facing a gear. The second hole is the discharge hole 98 through which the second gear chamber Sb accommodating the final gear FG communicates with the catch tank CT3. The discharge hole 98 is provided in the cover 9. The discharge hole 98 faces a side surface of the final gear FG in the rotation axis X1 direction.

(x) The opening area of the discharge hole 98 is smaller than the opening area of the discharge hole 77.

This can promote the storage of the oil OL in the catch tank CT2. When the vehicle equipped with the unit 1 is stopped, the oil can be returned to the second gear chamber Sb2 in which the final gear FG is disposed. For example, the second hole is an orifice.

(y) The catch tank CT5 of the cover 9 has the discharge hole 971 (third hole) facing the catch tank CT2. The discharge hole 971 communicates the catch tank CT5 with the catch tank CT2. When viewed from the rotation axis X1 direction, the discharge hole 971 (third hole) is positioned above the discharge hole 77 (first hole) in the gravity direction VL (see FIG. 13).

The movement of oil from the catch tank CT5 to the motor 2 can be promoted via the catch tank CT2.

(z) The catch tank CT4 has the discharge port 883 (fourth hole) directed toward the final gear FG. The discharge port 883 faces, for example, the side surface of the final gear FG in the rotation axis X1 direction.

The discharge port 883 (fourth hole) is positioned, for example, above the differential case 40 in the gravity direction VL. The discharge port 883 (fourth hole) has a function of introducing the oil OL into the differential case 40. When viewed from the rotation axis X1 direction, the discharge port 883 (fourth hole) is positioned on the vehicle front side of the catch tank CT4.

(aa) When viewed in the axial direction, an area of the catch tank CT3 is larger than that of the catch tank CT1, the catch tank CT2, and the catch tank CT4.

Since the amount of oil OL stored in the catch tank CT3 increases, the oil level in the housing HS can be further lowered. As a result, the stirring resistance when the final gear FG rotates decreases.

The term "shelf" in the present specification means an element (component, portion, or the like) having a portion sandwiched between the cover 9 and the motor 2. For example, the shelf can be formed using a part of the cover 9 and/or a part of the wall portion 72 (wall) of the housing HS.

In this case, the shelf has a portion integrally formed with other components, which is advantageous in cost and the like. For example, the shelf may be constituted by a component separate from the cover and/or the housing.

For example, the shelf includes the second ribs 720 and 920 having a portion surrounding at least a part of a lower side of the input gear 23 that rotates integrally with the motor shaft 20 which is the output shaft of the motor 2.

Since the oil OL stored in the shelf can be scattered in a predetermined direction using the rotation of the input gear 23, the oil OL can be fed in a desired direction. As a result, the oil feeding efficiency is improved.

For example, the shelf includes the third ribs 730 and 930 having a portion surrounding at least a part of a lower side of the large gear 33 that meshes with the input gear 23. Since the oil can be fed in a predetermined direction using the rotation of the large gear 33, the oil feeding efficiency is improved.

The term "tunnel" used in the present specification may be integrated with or separated from the cover 9 and/or the wall portion 72 (wall). When the tunnel is integrated with the cover 9 and/or the wall portion 72 (wall), it contributes to cost reduction and the like.

For example, the cover 9 has the tubular wall portion 991 (cover tunnel: cover protruding portion) protruding along the rotation axis X1.

For example, the wall portion 72 (wall) has the tubular wall portion 791 (wall tunnel: wall protruding portion) protruding along the rotation axis X1. In the case where the tunnel includes a plurality of elements (components, portions, or the like), a leakage amount can be reduced by providing a seal (sealing member SL) between two elements.

When the tunnel has a tubular portion, the leakage amount can be reduced. As the leakage amount decreases, the accuracy of the height adjustment of the oil level increases.

(ab) When viewed in the axial direction, the lower end 791a of the opening is positioned on the outer diameter side of the inner peripheral surface of the stator core 22.

The cooling efficiency of a stator coil end is improved.

Here, the term "communicate" in the present specification means that a plurality of spaces are connected. The "catch guide" is an element (component, portion, or the like) having a function of guiding oil.

The supply of oil from the outside of the guide to the guide is expressed as catch. The catch tank may have a function as the catch guide. For example, the catch guide is provided using at least a part of the housing, or is provided separately from the housing. When the catch guide is formed integrally with the housing, it contributes to a reduction in the number of components.

In the above embodiment, the case where the idler gear 3 and the differential device 4 are used as a gear train serving as a power transmission mechanism is exemplified. The power transmission mechanism may include, for example, an annular mechanism or a gear mechanism.

The annular mechanism in this case includes, for example, an endless annular component.

The endless annular component includes, for example, a chain sprocket, a belt and a pulley.

The gear mechanism in this case includes, for example, a reduction gear mechanism, an acceleration gear mechanism, and a differential gear mechanism.

The reduction gear mechanism and the acceleration gear mechanism include, for example, a planetary gear mechanism and a parallel gear mechanism.

The differential gear mechanism includes, for example, a bevel gear type differential gear and a planetary gear type differential gear.

The differential gear mechanism includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

A gear that rotates integrally with the differential case is, for example, a final gear (differential ring gear) in the parallel gear mechanism, and the final gear rotates integrally with the differential case.

For example, when a carrier of the planetary gear mechanism and the differential case are integrally formed, the pinion gear rotates (revolves) integrally with the differential case.

For example, a reduction gear mechanism is connected downstream of a motor. A differential gear mechanism is connected downstream of a reduction gear mechanism. That is, the differential gear mechanism is connected downstream of the motor via the reduction gear mechanism. Instead of the reduction gear mechanism, an acceleration gear mechanism may be used.

A single-pinion type planetary gear mechanism can use, for example, a sun gear for input, a fixed ring gear, and a carrier for output.

A double-pinion type planetary gear mechanism can use, for example, a sun gear for input, a ring gear for output, and a fixed carrier.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is a type that is not a stepped pinion gear.

When viewed in an axial direction, the motor has a portion overlapping the differential gear mechanism.

When viewed in the axial direction, the motor has a portion overlapping the reduction gear mechanism.

When viewed in the axial direction, the reduction gear mechanism has a portion overlapping the differential gear mechanism.

When viewed in the axial direction, the reduction gear mechanism has a portion overlapping the motor.

When viewed in the axial direction, the differential gear mechanism has a portion overlapping the reduction gear mechanism.

When viewed in the axial direction, the differential gear mechanism has a portion overlapping the motor.

When viewed in the axial direction, the motor has a portion overlapping the differential gear mechanism.

In a unit in which the motor and the differential gear mechanism are coaxial, the layout on an upper side in a vehicle height direction is less constrained than on a lower side in the vehicle height direction.

For example, a cover sandwiched between the differential gear mechanism and the motor is provided.

The cover has a portion accommodated in a housing. For example, the entire cover may be accommodated in the housing. For example, the cover may be sandwiched and fixed between two cases of the housing. In the latter case, a part of the cover is exposed to the outside of the housing.

Although the embodiments of the present invention have been described above, the present invention is not limited to the aspects shown in the embodiments. The embodiments can be changed as appropriate within the scope of the technical idea of the invention.

The present application claims a priority based on Japanese Patent Application No. 2021-106196 filed with the Japan Patent Office on Jun. 26, 2021, all the contents of which are hereby incorporated by reference.

DESCRIPTION OF REFERENCE SIGNS 1 unit
2 motor
3 idler gear
4 differential device
40 differential case
5 (5A, 5B) drive shaft
6 motor case
7 intermediate case
8 gear case
9 cover
CL air gap (gap)
CT1 to CT5 catch tank
FG final gear (gear)
HS housing

The invention claimed is:

1. A unit comprising:
a housing configured to accommodate a final gear connected to a motor; and
at least two catch tanks provided in the housing, wherein
the final gear rotates integrally with a differential case,
the two catch tanks each have a portion that overlaps the final gear when viewed in an axial direction,
the two catch tanks each have a portion that overlaps the motor when viewed in the axial direction,
oil levels different from each other are formed in the two catch tanks, and
the housing is configured to store oil below the two catch tanks in a gravity direction.

2. The unit according to claim 1, wherein
the two catch tanks each have a portion sandwiched between the motor and the final gear.

3. The unit according to claim 1, wherein
the two catch tanks have portions that overlap each other.

4. The unit according to claim 1, wherein
the housing has a rib defining the two catch tanks.

5. A unit comprising:
a housing configured to accommodate a final gear connected to a motor; and
catch tank provided in the housing, wherein
- the final gear rotates integrally with a differential case,
- the catch tank has a portion that overlaps the final gear when viewed in an axial direction,
- the catch tank has a portion that overlaps the motor when viewed in the axial direction,
- the final gear has a portion positioned between the differential case and the motor when viewed in a gravity direction,
- the final gear has a portion positioned between the catch tank and the motor when viewed in the gravity direction,
- the catch tank overlaps the motor and the final gear when viewed in the axial direction, and
- an opening of the catch tank faces the final gear.

6. The unit according to claim 5, wherein
a bottom surface of the catch tank has a portion inclined downward toward the front of a vehicle.

* * * * *